US005978610A

United States Patent [19]

Aoki

[11] Patent Number: 5,978,610

[45] Date of Patent: *Nov. 2, 1999

[54] EXPOSURE CONTROL APPARATUS FOR ELECTRONIC DEVELOPMENT TYPE CAMERA

[75] Inventor: Harumi Aoki, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,689

[22] Filed: Mar. 13, 1996

[30] Foreign Application Priority Data

Mar. 14, 1995 [JP] Japan .................................... 7-081983
Mar. 14, 1995 [JP] Japan .................................... 7-081984
Mar. 14, 1995 [JP] Japan .................................... 7-081985

[51] Int. Cl.[6] .................................................... G03B 19/00

[52] U.S. Cl. ............................................ 396/429; 396/273

[58] Field of Search .................................... 396/226, 228, 396/233–34, 236, 242–43, 247, 273, 276, 30, 429; 399/3

[56] References Cited

U.S. PATENT DOCUMENTS 4,199,236 4/1980 Goto et al. ................................ 354/50
4,284,341 8/1981 Yamada ..................................... 354/51
4,809,030 2/1989 Takagi et al. ........................... 354/414
4,984,088 1/1991 Tani et al. .
5,161,233 11/1992 Matsuo et al. .
5,191,408 3/1993 Takanashi et al. .
5,239,336 8/1993 Matsui et al. ........................... 354/416
5,294,990 3/1994 Aoki .
5,298,947 3/1994 Aono et al. .
5,315,410 5/1994 Takanashi et al. .
5,384,617 1/1995 Kobayashi et al. ..................... 354/419
5,408,341 4/1995 Takanashi et al. .
5,424,156 6/1995 Aoki et al. .
5,555,205 9/1996 Okabe .................................... 365/108

FOREIGN PATENT DOCUMENTS 0622954 11/1994 European Pat. Off. .
48-769 1/1973 Japan .
2-1693 1/1990 Japan .
3219270 9/1991 Japan .
4-211221 8/1992 Japan .
5-2280 1/1993 Japan .
6313896 11/1994 Japan .

*Primary Examiner*—Safet Metjahic
*Assistant Examiner*—John Chizmar
*Attorney, Agent, or Firm*—Greenblum, Berstein, P.L.C.

[57] ABSTRACT

An exposure control apparatus for an electronic development type camera having a photographic optical system. The camera uses a recording medium in which subject images formed through the photographic optical system are electrically developed. The exposure control apparatus includes a detecting device for detecting first photometric data which corresponds to subject light passed through the recording medium at a moment an exposure of the recording medium commences. The detecting device further detects second photometric data which corresponds to subject light passed through the recording medium after the exposure commences and before the exposure terminates. The exposure control apparatus further includes a calculating device for calculating a transmittance of the recording medium after the exposure commences, using the first and second photometric data, and a controlling device for controlling the exposure of the recording medium in accordance with the calculated transmittance.

36 Claims, 16 Drawing Sheets

EXPOSURE CONTROL APPARATUS FOR ELECTRONIC DEVELOPMENT TYPE CAMERA

BACKGROUND OF THE INVENTION

1. Field of the Invention

The present invention relates to an exposure control apparatus for a camera using a recording medium in which subject images formed through a photographic lens can be electronically developed.

2. Description of Related Art

Photographic mediums in which subject images formed through a photographic lens can be electronically developed are known. One example of a photographic medium of this type is disclosed in Japanese Unexamined Patent Publication No. 4-211221. In this patent publication, a recording medium is disclosed which includes a sensitized layer on which subject images are to be formed, and a light modulating layer through which the subject images, formed on the sensitized layer, are developed. Furthermore, in this publication, an exposure control is disclosed for controlling the amount of light passed through the sensitized layer and the light modulating layer to reach a predetermined level.

It should be noted that throughout this specification, the recording medium which can be electronically developed and a camera using the same are referred to as an electronic development type recording medium and an electronic development type camera, respectively.

The detected amount of light passed through the sensitized layer and the light modulating layer varies in accordance with the variation in intensity of subject light. Therefore, a precise transmittance of the recording medium cannot be measured with the structure disclosed in the above-noted Japanese Unexamined Patent Publication No. 4-211221, and it is accordingly difficult to carry out a precise exposure control. On the other hand, exposure control precision can be improved by employing a direct photometering system such as disclosed in Japanese Examined Patent Publication No. 48-769. However, the dispersion of transmittance or gamma of the recording medium cannot be compensated since the sensitivity and the like of the recording medium are not directly detected in a conventional direct photometering system.

Another example of a photographic medium of this type is disclosed in Japanese Unexamined Patent Publication No. 2-1693. In this publication, an electronic development type recording medium is disclosed which includes a sensitized layer on which subject images are to be formed and an electric-charge holding medium through which the subject images formed on the sensitized layer are developed. With such an electronic development type recording medium, the exposure time for the recording medium can be controlled by means of controlling the voltage applied to the sensitized layer and the electric-charge holding medium.

A focal-plane shutter, which is widely used in SLR cameras, can also be used for the electronic development type camera. In an electronic development type camera having a focal-plane shutter, in a slit exposure in which the trailing blades start moving before the leading blades completely open, if an exposure control for the electronic development type recording medium is carried out by merely controlling the focal-plane shutter, a dark current occurs in the unexposed portion of the recording medium, thus resulting in the occurrence of fogging in the unexposed portion caused by the difference in exposure time due to the slit exposure.

On the other hand, even in the case where the slit exposure is not performed due to a long exposure time, if an exposure control for the electronic development type recording medium is carried out by merely controlling the voltage application to the recording medium, an electric charge occurs in the electric charge generating layer of the recording medium due to an exposure in the state where no voltage is applied, thus resulting in the occurrence of fogging. In Japanese Unexamined Patent Publication No. 3-219270 it is noted that fogging occurs in the case when a voltage is applied to the electronic development type recording medium well before the recording medium starts to be exposed and that a precise exposure control cannot be achieved by merely controlling the voltage applied to the recording medium.

SUMMARY OF THE INVENTION

An object of the present invention is to provide an exposure control apparatus for an electronic development type camera which makes it possible to perform an exposure control having a high precision for the electronic development type recording medium.

To achieve the object mentioned above, according to the present invention, there is provided an exposure control apparatus for an electronic development type camera having a photographic optical system, the camera using a recording medium in which subject images formed through the photographic optical system are electrically developed. The exposure control apparatus includes means for detecting a first photometric data which corresponds to subject light passed through the recording medium at a moment an exposure of the recording medium commences, and for further detecting a second photometric data which corresponds to the subject light passed through the recording medium after the exposure commences and before the exposure finishes; means for calculating a transmittance of the recording medium after the exposure commences, using the first and second photometric data; and means for controlling the exposure of the recording medium in accordance with the calculated transmittance.

With this structure, since the exposure of the recording medium is controlled in accordance with the transmittance of the recording medium that is calculated using the first and second photometric data detected by the detecting means, a precise exposure control can be achieved even if there are variations in the illuminance of the image surface, the sensitivity and the gamma of the recording medium.

Preferably, the camera is provided with a focal-plane shutter behind which the recording medium is placed, and wherein the detecting means includes a photometering sensor placed behind the recording medium.

Preferably, the exposure control apparatus includes a condenser lens which introduces the subject light passed through the recording medium to the photometering sensor.

Preferably, the control means stops the exposure when the calculated transmittance reaches a predetermined reference value.

Preferably, the predetermined reference value is calculated, using a proportional fixed value which is predetermined by a characteristic of the photometering sensor, a transmittance of the recording medium at the moment the exposure of the recording medium commences, and an optimum transmittance of the recording medium.

Preferably, the exposure control apparatus further includes a memory for storing the first photometric data, wherein the calculating means calculates the transmittance by comparing the first photometric data stored in the memory with the second photometric data.

Preferably, the calculating means calculates a first logarithmic value corresponding to the first photometric data and a second logarithmic value corresponding to the second photometric data and further calculates the transmittance as a difference between the first and second logarithmic values.

The camera may be provided with a semitransparent mirror provided between the recording medium and the photometering sensor, wherein the photometering sensor receives light passed through the semitransparent mirror.

The camera may be provided with a mirror provided behind the recording medium, wherein the detecting means receives light reflected upon the mirror.

Preferably, the recording medium includes an electrostatic data recording medium in which an electric charge corresponding to a subject image is produced, and an electric charge holding medium in which the subject image is visually developed in accordance with the electric charge and which maintains the developed subject image, and wherein the electrostatic data recording medium and the electric charge holding medium each allow the subject light passed through the recording medium to pass therethrough.

Preferably, the electric charge holding medium is a dispersive-type liquid crystal display element.

Preferably, the camera is provided with a focal-plane shutter behind which the recording medium is placed, wherein the exposure control apparatus further includes a second detecting means for detecting subject light passed through the photographic optical system and reflected upon a front surface of the focal-plane shutter during pre-photometering, the second detecting means including a photometering sensor provided in front of the focal-plane shutter and outside an optical path of the photographic optical system.

Preferably, the exposure control apparatus further includes means for applying voltage to the recording medium, wherein the voltage applying means starts applying the voltage and subsequently stops applying the voltage to the recording medium while a shutter of the camera is fully open in the case where the shutter is driven with a shutter speed which is equal to or less than a predetermined reference exposure time.

According to another aspect of the present invention, there is provided an exposure control apparatus for an electronic development type camera having a photographic optical system, the camera using a recording medium in which subject images formed through the photographic optical system are electrically developed. The exposure control apparatus includes a first photometering sensor for detecting a first photometric data corresponding to subject light incident upon the recording medium; a second photometering sensor for detecting a second photometric data corresponding to subject light passed through the recording medium; means for calculating a transmittance of the recording medium after an exposure commences, using the first and second photometric data; and means for controlling the exposure of the recording medium in accordance with the calculated transmittance.

With this structure, since the exposure of the recording medium is controlled in accordance with the transmittance of the recording medium which is calculated using the first and second photometric data detected by the first and second photometering sensors, respectively, a precise exposure control can be achieved even if there are variations in the illuminance of the image surface, the sensitivity and the gamma of the recording medium.

Preferably, the control means stops the exposure when the calculated transmittance reaches a predetermined reference value.

Preferably, the predetermined reference value is calculated, using a first proportional fixed value which is predetermined by a characteristic of the first photometering sensor, a second proportional fixed value which is predetermined by a characteristic of the second photometering sensor, a reflectivity of a light receiving surface of the recording medium, and an optimum transmittance of the recording medium.

Preferably, the first photometric data corresponds to an intensity of subject light reflected upon a light receiving surface of the recording medium.

Preferably, the second photometric data corresponds to an intensity of the subject light passed through the recording medium.

Preferably, the calculating means calculates a first logarithmic value corresponding to the first photometric data and a second logarithmic value corresponding to the second photometric data and further calculates the transmittance as a difference between the first and second logarithmic values.

Preferably, the first photometering sensor is also actuated for photometering subject light during pre-photometering.

Preferably, the exposure control apparatus includes a focal-plane shutter, wherein the first photometering sensor receives subject light passed through the photographic optical system and reflected upon a front surface of the focal-plane shutter during the pre-photometering.

Preferably, the camera is provided with a focal-plane shutter behind which the recording medium is placed, wherein the first photometering sensor is placed in front of the focal-plane shutter and outside an optical path of the photographic optical system.

Preferably, the second photometering sensor is placed behind the recording medium.

Preferably, the exposure control apparatus further includes a condenser lens which introduces the subject light passed through the recording medium to the second photometering sensor.

The camera may be provided with a semitransparent mirror provided between the recording medium and the second photometering sensor, wherein the second photometering sensor receives light passed through the semitransparent mirror.

The camera may be provided with a mirror provided behind the recording medium, wherein the second photometering sensor receives light reflected upon the mirror.

Preferably, the recording medium includes an electrostatic data recording medium in which an electric charge corresponding to a subject image is produced, and an electric charge holding medium in which the subject image is visually developed in accordance with the electric charge and which maintains the developed subject image. The electrostatic data recording medium and the electric charge holding medium each allow the subject light passed through the recording medium to pass therethrough.

Preferably, the electric charge holding medium is a dispersive-type liquid crystal display element.

Preferably, the exposure control apparatus further includes means for applying voltage to the recording medium, wherein the voltage applying means starts applying the voltage and subsequently stops applying the voltage to the recording medium while a shutter of the camera is fully open in the case where the shutter is driven with a shutter speed which is equal to or less than a predetermined reference exposure time.

According to still another aspect of the present invention, there is provided an exposure control apparatus for an electronic development type camera having a photographic optical system, the camera using a recording medium in which subject images formed through the photographic optical system are electrically developed. The exposure control apparatus includes a shutter for opening and closing an optical path of the photographic optical system, the shutter being placed in front of the recording medium; means for applying voltage to the recording medium; means for controlling the voltage applying means; means for photometering subject light before the recording medium starts to be exposed by releasing the shutter; means for calculating an exposure time at which the shutter is driven, using photometering data obtained through the photometering means; and means for controlling an exposure of the recording medium by controlling the shutter and the voltage controlling means in a manner such that the shutter opens and subsequently closes within a period the voltage applying means applies the voltage to the recording medium, in the case where the calculated exposure time is greater than a predetermined reference exposure time, and that the voltage applied to the recording medium is controlled while the shutter is open in the case where the calculated exposure time is equal to or less than the predetermined reference exposure time.

With this structure, since the exposure of the recording medium is controlled by controlling the voltage applied to the recording medium while the shutter is open in the case where the calculated exposure time is equal to or less than the predetermined reference exposure time, e.g., in the case where the calculated exposure time is a short exposure time which usually requires a slit exposure, the exposure of the recording medium with such a short exposure time can be achieved without performing the slit exposure, thereby the occurrence of fogging in the unexposed portion caused by the difference in exposure time due to the slit exposure is prevented.

Preferably, the shutter is a focal-plane shutter, and wherein the predetermined reference exposure time is slower than an exposure time which would be necessary for the shutter to carry out a slit exposure.

Preferably, the exposure controlling means controls the shutter and the voltage controlling means in a manner such that the voltage applying means starts applying the voltage to the recording medium after the shutter has fully opened, in the case where the calculated exposure time is equal to or less than the predetermined reference exposure time.

Preferably, the exposure controlling means controls the shutter and the voltage controlling means in a manner such that the shutter starts closing after the voltage applying means stops applying the voltage to the recording medium in the case where the calculated exposure time is equal to or less than the predetermined reference exposure time.

Preferably, the recording medium includes an electrostatic data recording medium in which an electric charge corresponding to a subject image is produced, and an electric charge holding medium in which the subject image is visually developed in accordance with the electric charge and which maintains the developed subject image, and wherein the electrostatic data recording medium and the electric charge holding medium each allow the subject light passed through the recording medium to pass therethrough.

Preferably, the electric charge holding medium is a dispersive-type liquid crystal display element.

Preferably, the shutter is a focal-plane shutter, wherein the photometering means includes a photometering sensor which receives subject light passed through the photographic optical system and reflected upon a front surface of the focal-plane shutter.

Preferably, the photometering sensor is placed in front of the focal-plane shutter and outside an optical path of the photographic optical system.

According to still another aspect of the present invention, there is provided an exposure control apparatus for an electronic development type camera having a photographic optical system, the camera using a recording medium in which subject images formed through the photographic optical system are electrically developed. The exposure control apparatus includes a shutter for opening and closing an optical path of the photographic optical system, the shutter being placed in front of the recording medium; means for applying voltage to the recording medium; means for controlling the voltage applying means; means for photometering subject light before the recording medium starts to be exposed by releasing the shutter; means for calculating an exposure time at which the shutter is driven, using photometering data obtained through the photometering means; and means for controlling an exposure of the recording medium by controlling the shutter and the voltage controlling means in a manner such that the shutter opens and subsequently closes within a period the voltage applying means applies the voltage to the recording medium, in the case where the calculated exposure time is greater than a predetermined reference exposure time, and that the voltage applying means starts applying the voltage to the recording medium and subsequently stops applying the voltage to the recording medium while the shutter is fully open in the case where the calculated exposure time is equal to or less than the predetermined reference exposure time.

Preferably, the shutter is a focal-plane shutter, and wherein the predetermined reference exposure time is slower than an exposure time which would be necessary for the shutter to carry out a slit exposure.

The present disclosure relates to subject matter contained in Japanese Patent Applications No. 7-81983 (filed on Mar. 14, 1995), No. 7-81984 (filed on Mar. 14, 1995) and No. 7-81985 (filed on Mar. 14, 1995) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
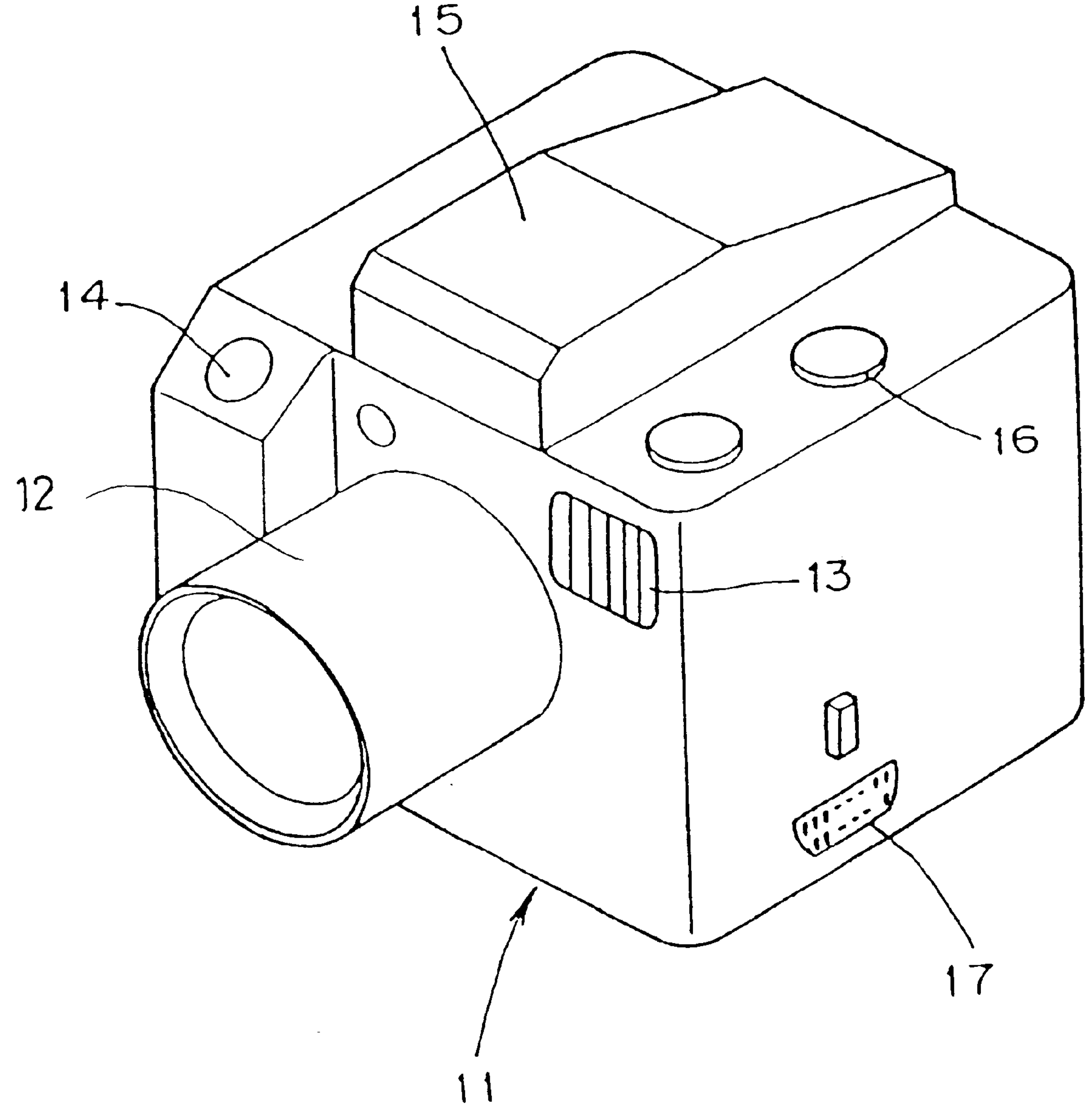
FIG. 1 is a perspective view of an electronic development type camera to which the exposure control apparatus of the present invention is applied.

The camera shown in FIG. 1 is an electronic development type camera according to a first embodiment of the present invention.

As viewed from the front of the camera body 11, the camera is provided, in substantially the central part of the camera body 11, with a photographic lens 12 including a photographic optical system, a diaphragm 12*a* (FIG. 2), etc. therein. A strobe 13 is provided above and to the right of the photographic lens 12. A release switch 14 is provided on the opposite side of the strobe 13, with respect to the photographic lens 12. A finder 15 is provided on the upper central portion of the camera body 11. The camera body 11 is provided on one side of the finder 15 with a scanning start switch 16. The camera body 11 is provided, on the lower portion of the side surface thereof, with an output terminal 17 for outputting obtained image signals to an external recording device, an external monitoring device, etc.

Figure 2:
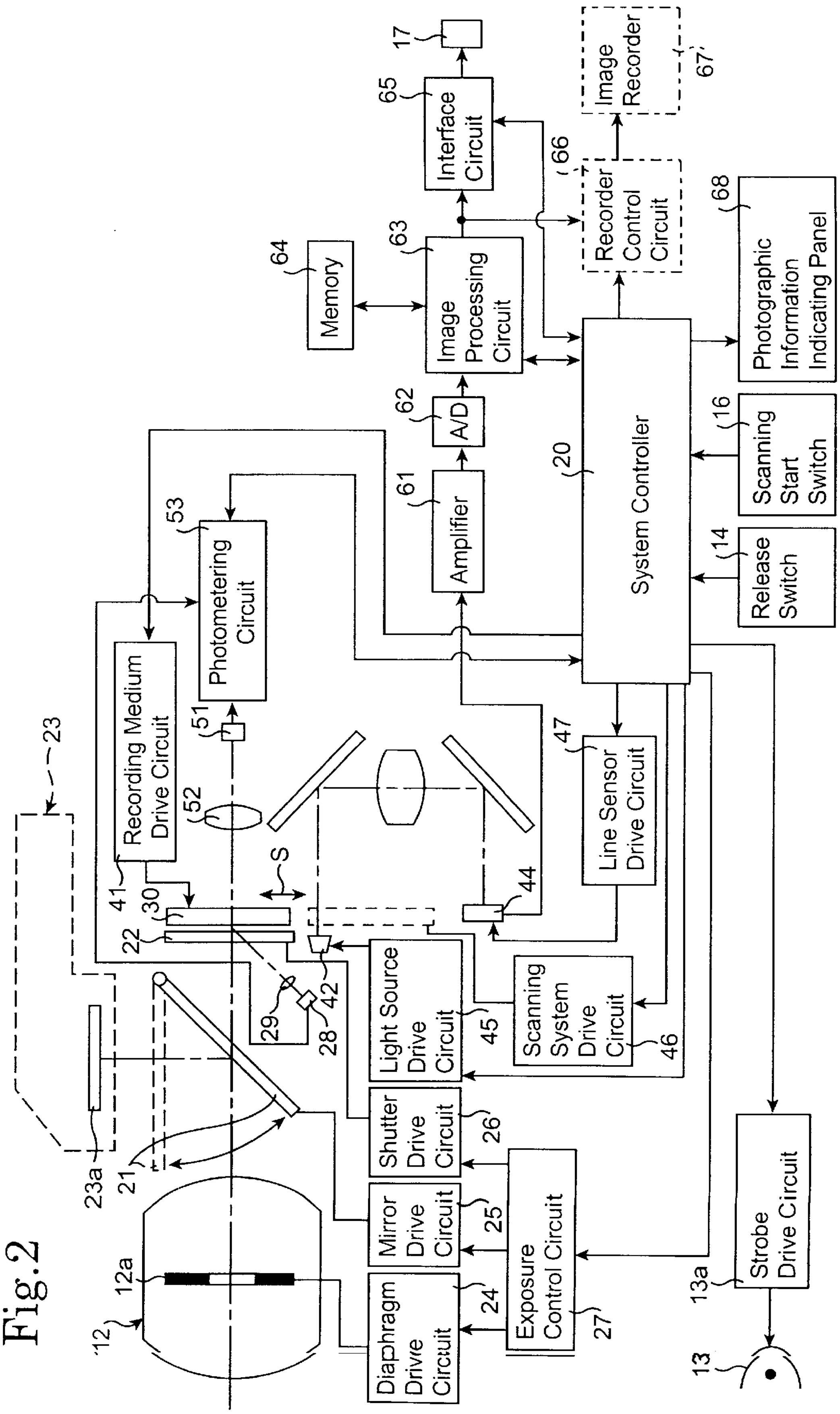
FIG. 2 is a block diagram of the main circuitry of the camera shown in FIG. 1.

FIG. 2 shows a block diagram of the electronic development type camera shown in FIG. 1. A system controller 20 is a microcomputer which, in general, controls the electronic development type camera.

The photographic lens 12 includes a plurality of lens groups and the diaphragm 12*a*. An electronic development type recording medium 30 is located behind the photographic lens 12. The recording medium 30 is inserted into and discharged from the camera body 11 through an insertion slot (not shown) provided on the camera body 11. A certain voltage is applied to the electronic development type recording medium 30 in accordance with the control of a recording medium drive circuit 41 which is connected to the system controller 20. The electronic development type recording medium 30 is exposed to subject light, passed through the photographic lens 12, while a certain voltage is being applied thereto, so that subject images formed on the recording medium 30 through the photographic lens 12 are electronically developed to be visible subject images. The recording medium actuating circuit 41 operates in accordance with a command signal output from the system controller 20.

A quick return mirror 21 is provided between the photographic lens 12 and the electronic development type recording medium 30. A shutter 22 is provided between the quick return mirror 21 and the electronic development type recording medium 30. The shutter 22 is a focal-plane shutter including leading blades (or leading curtain) and trailing blades (or trailing curtain). A focusing screen 23*a* of a finder optical system 23 is provided in the finder 15 above the quick return mirror 21.

The camera is provided, in front of the shutter 22 and outside the optical path of the photographic lens 12, with a first photometering sensor 28. A condenser lens 29 is provided between the first photometering sensor 28 and the shutter 22. The camera is also provided, behind the recording medium 30, with a second photometering sensor 51. The front surface of the shutter 22, which faces in the direction of the photographic lens 12, is formed so as to have substantially the same reflectivity and characteristics of reflection as those of the light receiving surface of the recording medium 30, so that the intensity of light passed through the photographic lens 12 and incident upon the light receiving surface of the recording medium 30 can be indirectly photometered through the first photometering sensor 28 prior to the commencement of the exposure of the recording medium 30. A condenser lens 52 is provided between the second photometering sensor 51 and the recording medium 30. The first and second photometering sensors 28 and 51 are connected to a photometering circuit 53, so that the photometering circuit 53 receives the signals output from the first and second photometering sensors 28 and 51.

The diaphragm 12*a*, the quick return mirror 21 and the shutter 22 are driven by a diaphragm drive circuit 24, a mirror drive circuit 25 and a shutter drive circuit 26, respectively. These drive circuits 24, 25, 26 are all connected to and controlled by an exposure control circuit 27. The exposure control circuit 27 operates in accordance with a command signal supplied from the system controller 20.

When an exposure calculation is performed in the system controller 20, the shutter 22 remains closed and the first photometering sensor 28 detects the light reflected by the front surface of the shutter 22. The exposure calculation is performed in the system controller 20 in accordance with the detected photometric data of the first photometering sensor 28. The exposure control circuit 27 controls the diaphragm drive circuit 24 to adjust the size of the opening of the diaphragm 12*a*. When the release button 14 is fully depressed, i.e., upon taking a picture, the exposure control circuit 27 controls the shutter drive circuit 26 to release the shutter 22. When the shutter 22 is open, the first photometering sensor 28 detects the light reflected by the front surface (i.e., light receiving surface) of the recording medium 30 while the second photometering sensor 51 detects the light passed through the recording medium 30.

The quick return mirror 21 is normally located in a lower position (i.e., an inclined position indicated by the solid line in FIG. 2), in which light transmitted through the photographic lens 12 reaches the finder optical system 23 of the finder 15 so that subject images can be viewed therethrough. Upon taking a picture, the quick return mirror 21 is rotated to an upper position (i.e., a horizontal position indicated by the dotted line in FIG. 2) by the mirror drive circuit 40.

The electronic development type recording medium 30 is guided by a sub-scanning direction guide mechanism (not shown) in substantially a vertical direction perpendicular to the optical axis of the photographic lens 12 (i.e., the direction indicated by the arrow S in FIG. 2.), so that the recording medium 30 is movable between a position indicated by the solid line and a position indicated by the dotted line in FIG. 2.

A light source 42, a scanning optical system 43 and a line sensor 44 are provided in the vicinity of the path of the electronic development type recording medium 30. The light source 42 may comprises of an LED and a collimating lens, and is made so as to emit a collimated beam of light having at least a width to cover the line sensor 44 in the longitudinal direction thereof.

Figure 3:
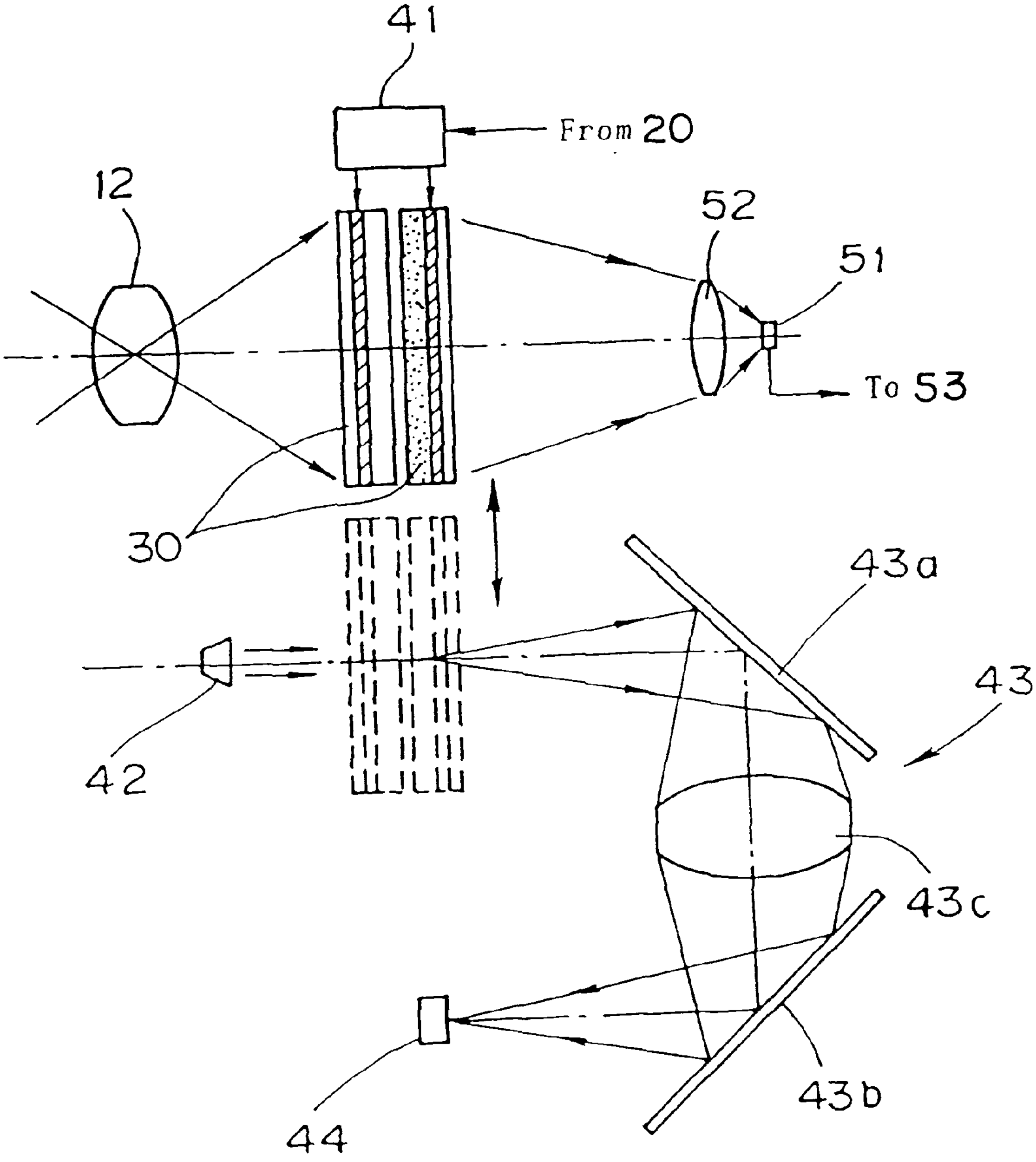
FIG. 3 is a schematic side view of an electronic development type recording medium, a scanning optical system and the peripheral members thereof in the camera shown in FIG. 1.

The scanning optical system 43 comprises a first mirror 43*a*, a second mirror 43*b* and a lens 43*c* (FIG. 3). The line sensor 44 is, for example, a one-dimensional CCD sensor having, for example, 2,000 pixels. The recording medium 30 is driven to move across the light source 42. While the recording medium 30 is moving across the light source 42, the light emitted from the light source 42 passes through the recording medium 30, and subsequently reaches the line sensor 44 through the first mirror 43*a*, the lens 43*c* and the second mirror 43*b*, so that the visible image developed on the recording medium 30 is read through the line sensor 44, as shown in FIG. 3.

The ON/OFF control of the light source 42 is carried out by a light source drive circuit 45. A line sensor drive circuit 47 controls the line sensor 44 to generate pixel signals to be read out. The movement of the recording medium 30 is controlled by a scanning system drive circuit 46. Drive circuits 45, 46 and 47 are all connected to and controlled by the system controller 20.

The pixel signals are successively read from the line sensor 44 through the line sensor drive circuit 47 in accordance with control by the system controller 20. The pixel signals thus read are amplified by an amplifier 61 and are converted into digital pixel signals by an A/D converter 62. The digital pixel signals are subject to several image processes, such as, a shading compensation and a gamma compensation, etc., in an image processing circuit 63, in accordance with control commands from the system controller 20, and are thereafter temporarily stored in a memory 64. The memory 64 has a necessary storage capacity to store the pixel signals, output from the line sensor 44, corresponding to one horizontal scan. The memory 64 may be a frame memory which can store the pixel signals corresponding to one frame. The memory 64 may include an $E^2$PROM in which compensation values of the above-mentioned shading compensation and gamma compensation may be stored.

The pixel signals stored in the memory 64 are read therefrom in accordance with need, i.e., when needed the pixel signals are read from the memory 64 by the image processing circuit 63, and then input to an interface circuit 65 where they are subjected to a format conversion, etc., before being sent to an external monitoring device (not shown), etc., through the output terminal 17. Moreover, the pixel signals output from the image processing circuit 63 are compressed or subjected to a format conversion, etc., by a recorder control circuit 66. Thereafter, the pixel signals can be recorded in a recording medium, such as an IC memory card or a floppy disc, by an image recorder 67. The interface circuit 65 and the recorder control circuit 66 are actuated in accordance with command signals supplied by the system controller 20.

The release switch 14 and the scanning start switch 16 are connected to the system controller 20. The system controller 20 carries out a photographing operation when the release switch 14 is operated and also carries out a reading operation in which the pixel signals are read from the recording medium 30 when the scanning start switch 16 is operated.

A strobe drive circuit 13*a* is connected to the system controller 20 and controls the strobe 13 to fire in accordance with a command signal output from the system controller 20.

A photographic information indicating panel 68, such as an LCD panel, is connected to the system controller 20. The indicating panel 68 indicates various data or information needed by a photographer in connection with the photographing operation. The indicating panel 68 may be provided on the camera body 11 and/or in the visible field seen through the finder 15.

Figure 4:
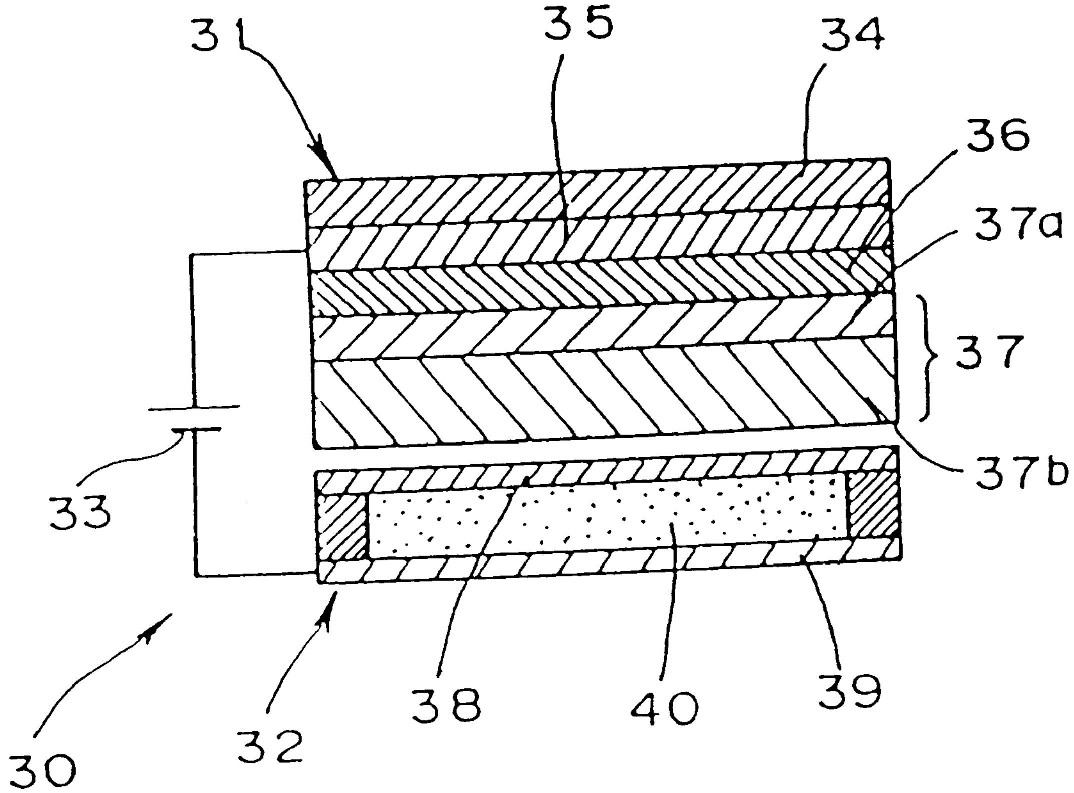
FIG. 4 is a schematic sectional view of an electronic development type recording medium used for the camera shown in FIG. 1.

FIG. 4 shows the structure of the electronic development type recording medium 30, which is similar to that disclosed in Japanese Unexamined Patent Publication No. 5-2280.

The electronic development type recording medium 30 comprises an electrostatic data recording medium 31 and an electric charge holding medium 32. The electrostatic data recording medium 31 has a laminated structure consisting of a substrate 34, an electrode layer 35, an inorganic oxide layer 36 and a photoconductive layer 37. The photoconductive layer 37 is made up of an electric charge generating layer 37*a* and an electric charge carrying layer 37*b* laid thereon. The electrostatic data recording medium 31 is optically transparent as a whole. The electric charge holding medium 32 is comprised of a transparent supporting plate 38, a transparent electrode plate 39 and a liquid crystal 40 enclosed therebetween. The electric charge carrying layer 37*b* of the electrostatic data recording medium 31 is opposed to the transparent supporting plate 38 of the electric charge holding medium 32 with a slight gap therebetween. The electrostatic data recording medium 31 and the electric charge holding medium 32 each allow light to pass therethrough.

A predetermined voltage is applied from a power source 33 between the electrostatic data recording medium 31 and the electric charge holding medium 32 when the power source 33 is turned ON. The power source 33 is controlled to be turned ON or OFF by the recording medium drive circuit 41. The power source 33 itself does not constitute a part of the electronic development type recording medium 30, but instead constitutes a part of the recording medium drive circuit 41.

Power supplied to the electronic development type recording medium 30 is controlled by the recording medium drive circuit 41, so that when power is supplied, a predetermined voltage is applied between the electrode layer 35 of the electrostatic data recording medium 31 and the transparent electrode plate 39 of the electric charge holding medium 32. In this state, if the electronic development type recording medium 30 is exposed, the electric charge distribution corresponding to the contrast of the subject images is produced in the electrostatic data recording medium 31, and the electric field, whose intensity corresponds to the electric charge distribution, acts on the liquid crystal 40 of the electric charge holding medium 32. Consequently, visible subject images appear on the liquid crystal 40. Thus, the electronic image obtained by the electrostatic data recording medium 31 is immediately developed by the electric charge holding medium 32. The electrostatic data recording medium 31 and the electric charge holding medium 32 each continue to allow light to pass therethrough when the predetermined voltage is applied between the electrode layer 35 and the transparent electrode plate 39, though the transmittance of the electric charge holding medium 32 changes.

The electric charge holding medium 32 is a dispersive-type liquid crystal display element or a memory-type liquid crystal display element. Therefore, the visible subject image recorded on the electric charge holding medium 32 can be maintained even after the electric field has been removed. The visible subject image recorded on the electric charge holding medium 32 can be erased by applying heat of a predetermined temperature to the electric charge holding medium 32 by means of a heating device (not shown). Thus, through the use of such a heating device, the same electronic development type recording medium 30 can be repeatedly used.

The fundamental idea of the exposure control in this embodiment of the present invention will be hereinafter explained. Here it is assumed that the transmittance of a certain recording medium is constant when it has not been exposed and that the illuminance of the image surface of the recording medium is constant while it is being exposed.

With the above-noted assumption, the amount of exposure of the recording medium (i.e., the amount of light the recording medium is exposed to) is obtained by the following equation (1):

$$H=If\times t \tag{1}$$

wherein "H" represents the amount of exposure of the recording medium;

"If" represents the illuminance of the image surface of the recording medium (i.e., the intensity of light incident upon the recording medium); and "t" represents the exposure time.

The exposure time t is determined such that the exposure amount H becomes an optimum exposure amount $H_{(opt)}$.

In the case where the recording medium is a light-transmissible type recording medium (e.g., the electronic development type recording medium 30), the transmittance varies in accordance with variations in the exposure amount H. Therefore, in order to obtain the optimum exposure amount $H_{(opt)}$ for the electronic development type recording medium 30, the exposure time t needs to be determined such that the value of transmittance becomes an optimum value.

Figure 5:
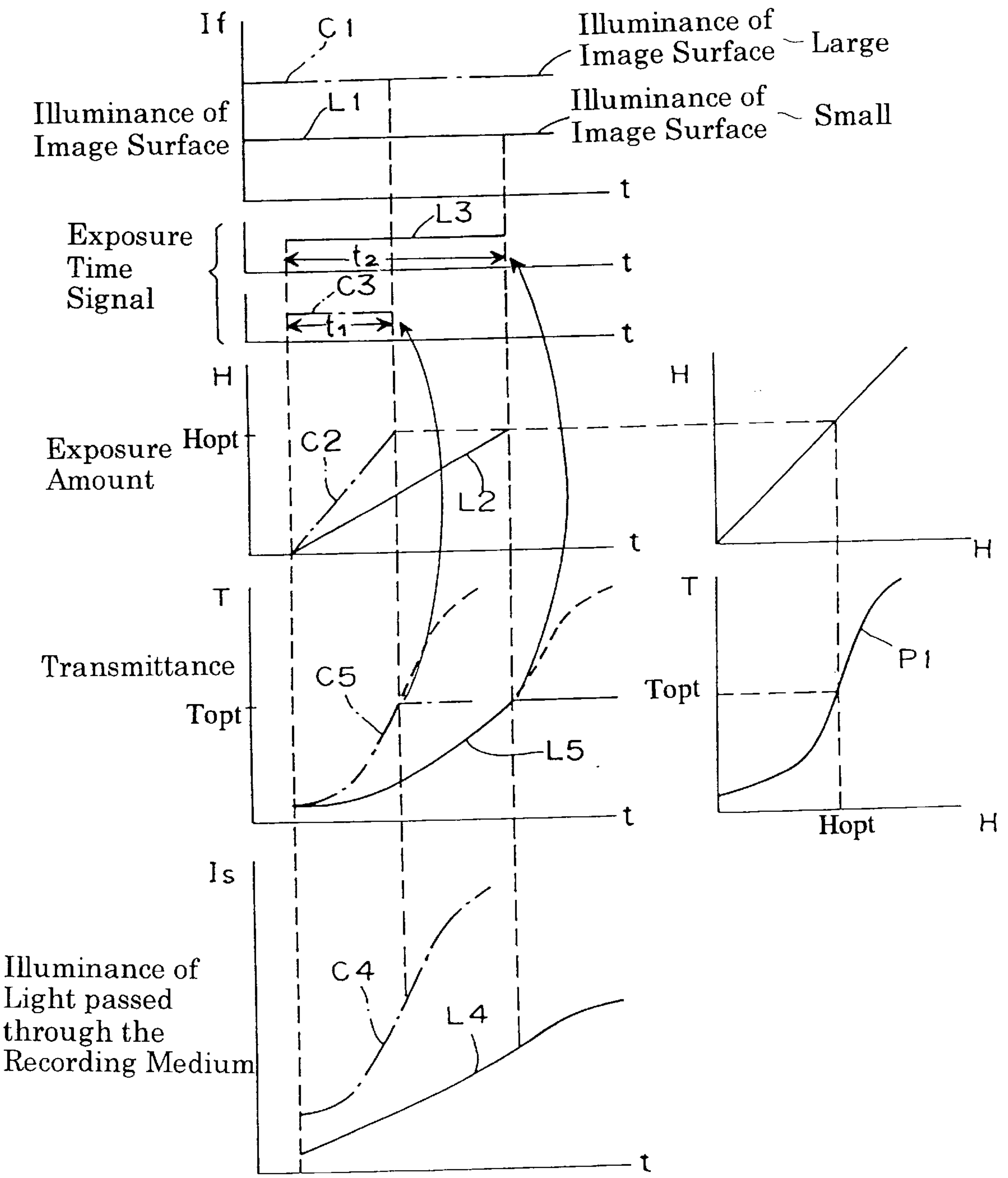
FIG. 5 displays graphs showing variations over time in the image surface illuminance, exposure time signal, exposure amount, transmittance and illuminance of light passed through the electronic development type recording medium, in the exposure control to which the present invention is applied.

The transmittance and amount of exposure of the electronic development type recording medium 30 each vary in accordance with variations in time and have the relationship such as shown by the solid line P1 in the graph shown in FIG. 5. It will be appreciated from the graph in FIG. 5 that the inclination of the solid line P1, i.e., the ratio of variation of the transmittance relative to the exposure amount (i.e., gamma), varies depending on the exposure amount H. Hence, the gamma is a function of the exposure amount H. The transmittance of the electronic development type recording medium 30 can be defined by the following equation (2):

$$T=k\times H \tag{2}$$

wherein "T" represents the transmittance, and

"k" represents the gamma.

Since "H" is equal to "If×t" as noted above in equation (1), the following equation (3) is obtained:

$$T=k\times If\times t \tag{3}$$

If it is assumed that "$T_{(opt)}$" is the optimum transmittance, then the following equation (4) is defined:

$$T_{(opt)}=k\times H_{(opt)}=k\times If\times t \tag{4}$$

Therefore, the exposure time t is determined such that the transmittance T becomes the optimum transmittance $T_{(opt)}$.

On the other hand, the illuminance of light passed through the electronic development type recording medium 30 having been already developed is defined by the following equation (5):

$$Is=T\times If \tag{5}$$

wherein "Is" represents the illuminance of light passed through the electronic development type recording medium 30 after it starts to be exposed.

Thus, the illuminance of light passed through the electronic development type recording medium 30 at the moment the recording medium starts to be exposed (i.e., t=0) is defined by the following equation (6):

$$Is_{(0)}=T_{(0)}\times If \tag{6}$$

wherein "$Is_{(0)}$" represents the illuminance of light passed through the electronic development type recording medium 30 at the moment the recording medium starts to be exposed, and "$T_{(0)}$" represents the transmittance of the electronic development type recording medium 30 at the moment the recording medium starts to be exposed.

Therefore, the illuminance of light passed through the electronic development type recording medium 30 during exposure at the moment after a time "tn" elapses after the exposure starts is defined by the following equation (7):

$$Is_{(tn)}=T_{(tn)}\times If \tag{7}$$

wherein "$IS_{(tn)}$" represents the illuminance of light passed through the electronic development type recording medium 30 during exposure at the moment after a time tn elapses after the exposure starts, and "$T_{(tn)}$" represents the transmittance of the electronic development type recording medium 30 at the moment after a time tn elapses after the exposure starts.

If it is assumed that the optimum transmittance $T_{(opt)}$ is obtained at the moment after a time "t1" elapses after the exposure starts, then the following equation (8) is defined:

$$Is_{(t1)}=T_{(opt)}\times If \tag{8}$$

By comparing equation (6) with equation (8), the following equation (9) is defined:

$$Is_{(t1)}/Is_{(0)}=T_{(opt)}/T_{(0)} \tag{9}$$

It will be appreciated from equation (9) that the optimum exposure amount $H_{(opt)}$ can be obtained by determining the exposure time "t" which satisfies equation (9).

In an embodiment of the present invention, the photometric data (i.e., subject light data) which corresponds to the illuminance of light passed through the electronic development type recording medium 30 is detected by the second photometering sensor 51 at the moment the recording medium starts to be exposed, i.e., the photometric data corresponding to the above-mentioned illuminance $Is_{(0)}$ is detected by the second photometering sensor 51, and subsequently, the detected photometric data is stored in a memory. Thereafter, during exposure, the second photometering sensor 51 continues to detect the illuminance Is which varies as time elapses, and the exposure is completed when the ratio of the detected illuminance Is and the above-mentioned illuminance $Is_{(0)}$ reaches a reference value which is determined based on equation (9), with a judgement that the optimum transmittance $T_{(opt)}$ has been obtained.

The photometric data detected by the second photometering sensor 51 corresponds to the value of electric current which varies depending upon the intensity of light passed through the electronic development type recording medium 30. This value of electric current is logarithmic-transformed while converted into a voltage. That is, the voltage that is obtained in accordance with the photometric data detected by the second photometering sensor 51 at the moment the recording medium starts to be exposed is defined by the following equation (10):

$$V2_{(0)}=\log(\alpha 2\times T_{(0)}\times If) \tag{10}$$

wherein "$V2_{(0)}$" represents the voltage that is obtained in accordance with the photometric data detected by the second photometering sensor 51 at the moment the recording medium starts to be exposed, and "α2" represents the proportional fixed number which is determined by the characteristic of the second photometering sensor 51.

On the other hand, the voltage that is obtained in accordance with the photometric data detected by the second photometering sensor 51 during exposure at a moment after the time t1 elapses after the exposure starts is defined by the following equation (11):

$$V2_{(t1)}=\log(\alpha 2\times T_{(t1)}\times If) \tag{11}$$

wherein "$V2_{(t1)}$" represents the voltage that is obtained in accordance with the photometric data detected by the second photometering sensor 51 during exposure at a moment after the time t1 elapses after the exposure starts.

Accordingly, the optimum exposure amount $H_{(opt)}$ can be obtained by determining the exposure time t such that the difference between the voltage $V2_{(t1)}$ and the voltage $V2_{(0)}$ becomes equal to the difference between $\log(T_{(opt)})$ and $\log(T_{(0)})$, that is, by determining the exposure time t such that the following equation (12) is satisfied:

$$V2_{(t1)}-V2_{(0)}=\log(T_{(opt)})-\log(T_{(0)}) \tag{12}$$

The value of "$\log(T_{(opt)}-\log(T_{(0)})$" in equation (12) is stored as a reference value. This reference value is calculated, using the proportional fixed value α2, the transmittance $T_{(0)}$ and the optimum transmittance $T_{(opt)}$, and is prestored in a memory provided in the photometering circuit 53. With this arrangement, according to the first embodiment of the present invention, exposure of the recording medium 30 is completed the moment the ratio of the illuminances Is and $Is_{(0)}$ reaches the prestored reference value, determined by equation (12), to thereby obtain the optimum exposure amount $H_{(opt)}$ for the recording medium 30.

The exposure control of the camera of the first embodiment will be hereinafter discussed with reference to FIG. 5.

In FIG. 5, the broken line C1 shows the illuminance of the image surface of the electronic development type recording medium 30 in the case where the illuminance is large. On the other hand, the solid line L1 shows the illuminance of the same in the case where the illuminance is small. Although, in reality, the illuminance of the image surface varies as time elapses, it is assumed in this embodiment that the illuminance is constant.

The exposure amount H can be calculated by multiplying the illuminance of the image surface If by the exposure time t as shown in equation (1). Namely, the exposure amount H linearly increases as time elapses, as shown by the broken line C2 and the solid line L2. The greater the illuminance of the image surface If is, the higher the increase ratio of the exposure amount is. Due to this, the greater the illuminance of the image surface is, the faster the exposure amount H reaches the optimum exposure amount $H_{(opt)}$. Furthermore, the exposure time $t_1$ (broken line C3), in the case where the illuminance of the image surface is large, is shorter than the exposure time $t_2$ (solid line L3), in the case where the illuminance of the image surface is small.

The relationship between the exposure amount H and the transmittance T is shown by the solid line P1. Hence, if the optimum exposure amount $H_{(opt)}$ is once determined, the corresponding optimum transmittance $T_{(opt)}$ is automatically determined. The transmittance T corresponds to the ratio of the illuminance of light passed through the recording medium 30 (i.e., illuminance Is) and the illuminance of the image surface of the recording medium 30 (i.e., illuminance If), as can be seen from equations (5) and (6). Hence, the illuminance Is rapidly increases in the case where the illuminance If is large, as shown by the broken line C4, whereas the illuminance Is gradually increases in the case where the illuminance If is small, as shown by the solid line L4. Since the illuminance If is constant, the transmittance T reaches the optimum transmittance $T_{(opt)}$ faster in the case where the illuminance If is large (in case of the broken line C5), rather than in the case where the illuminance If is small (in case of the solid line L5).

As can be seen from the foregoing, in an embodiment of the present invention, the variational ratio of the transmittance T over time (see equation (9)) obtained through the second photometering sensor 51 is detected, and the exposure is completed when the variational ratio reaches a predetermined control value to thereby obtain the optimum exposure amount $H_{(opt)}$.

Figure 6:
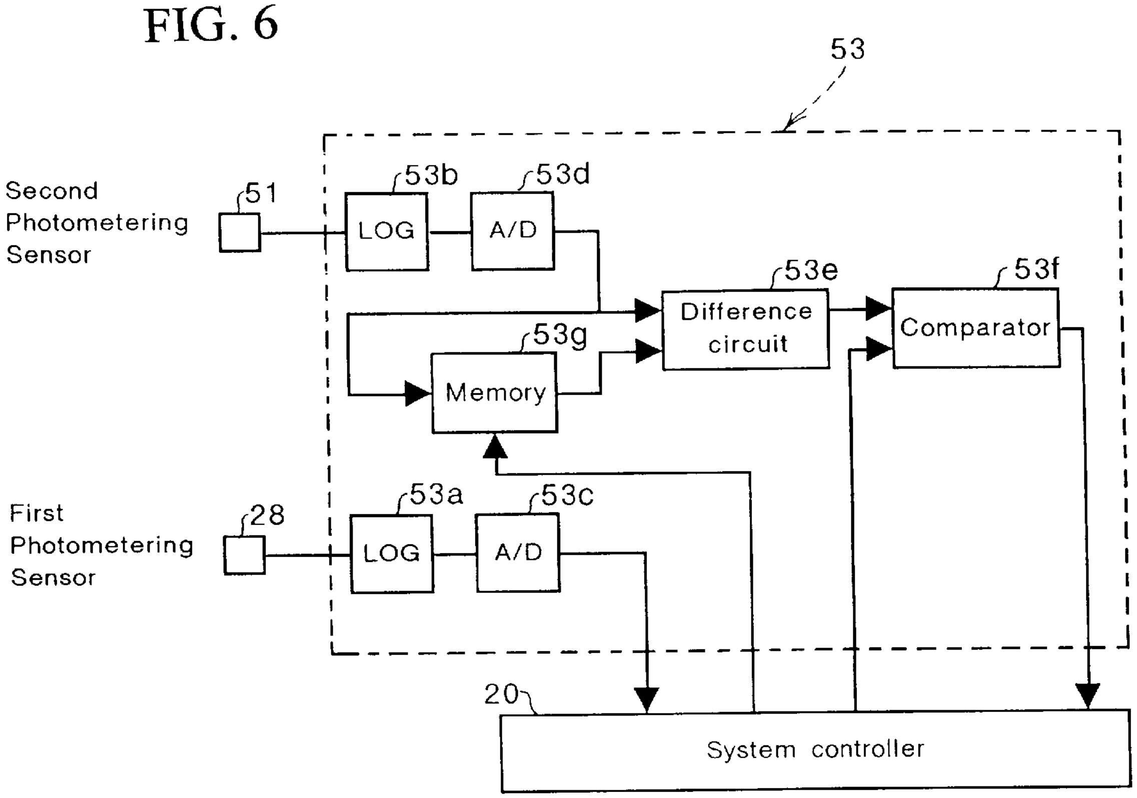
FIG. 6 is a block diagram of the photometering circuit of the camera shown in FIG. 1.

FIG. 6 shows a block diagram of the photometering circuit 53 which performs the above-explained exposure control of the first embodiment of the present invention. As shown in FIG. 6, the photometering circuit 53 comprises of a first logarithmic transforming circuit 53*a*, a second logarithmic transforming circuit 53*b*, a first A/D converter 53*c*, a second A/D converter 53*d*, a difference circuit 53*e*, a comparator 53*f* and a memory 53*g*.

The current value that corresponds to the signal output from the first photometering sensor 28 is logarithmic-transformed and converted into voltage V1, through the first logarithmic transforming circuit 53*a*, and subsequently, converted into digital signals through the first A/D converter 53*c*. These digital signals are inputted to the system controller 20 as the photometric data obtained during pre-photometering. Upon pre-photometering, e.g., when the release switch 14 is half-depressed, photometric information is visually displayed on the indicating panel 68 in accordance with the above obtained photometric data, and the opening of the diaphragm 12*a* is adjusted in accordance with the photometric data.

The current value that corresponds to the signal output from the second photometering sensor 51 is logarithmic-transformed and converted into voltage V2 or $V2_{(0)}$ through the second logarithmic transforming circuit 53*b* (see equations (10) and (11)), and subsequently, converted into digital signals through the second A/D converter 53*d*. The voltage $V2_{(0)}$, which is obtained the moment the recording medium 30 starts to be exposed, is stored in memory 53*g* while voltage V2 is inputted to the difference circuit 53*e*. In the difference circuit 53*e* the difference between the voltages V2 and $V2_{(0)}$ (see equation (12)), i.e., the control value, is calculated. In the comparator 53*f* the signal that corresponds to the calculated control value is compared with the stored reference value (the value of "$\log(T_{(opt)}) - \log(T_{(0)})$" in equation (12)). When it is judged that the signal corresponding to the calculated control value becomes equal to the stored reference value, as a result of the comparison, the system controller controls the shutter drive circuit 26 to close the shutter 22 through the exposure control circuit 27 with a judgement that the exposure amount for the electric development type recording medium 30 has reached the optimum exposure amount.

Figure 7:
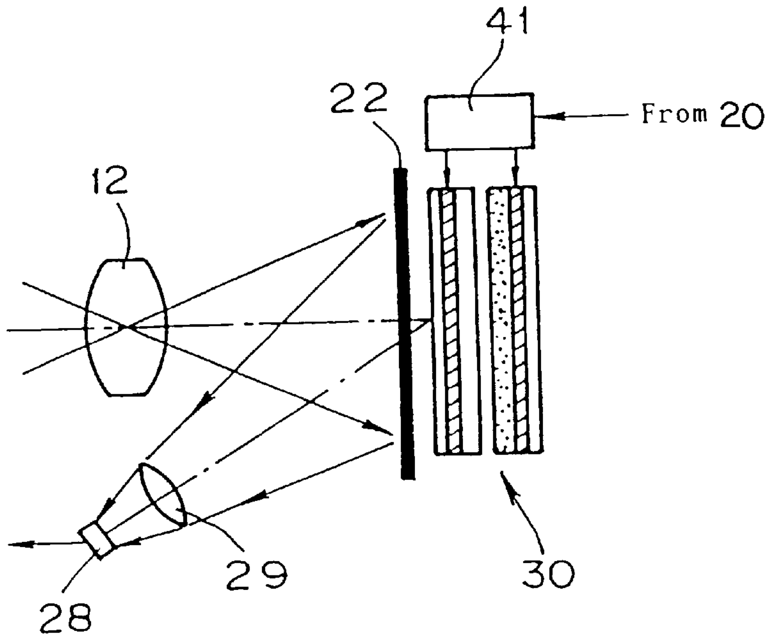
FIG. 7 is a schematic side view of the photographic lens, the first photometering sensor, the condenser lens, the focal-plane shutter and the electronic development type recording medium in the camera shown in FIG. 1, showing the path of light which is received by the first photometering sensor when a pre-photometering is performed.

As shown in FIG. 7, upon pre-photometering, the shutter 22 is closed and the light passed through the photographic lens 12 is reflected on the front surface of the shutter 22, and a part of the reflected light reaches the first photometering sensor 28 through the condenser lens 29.

Figure 8:
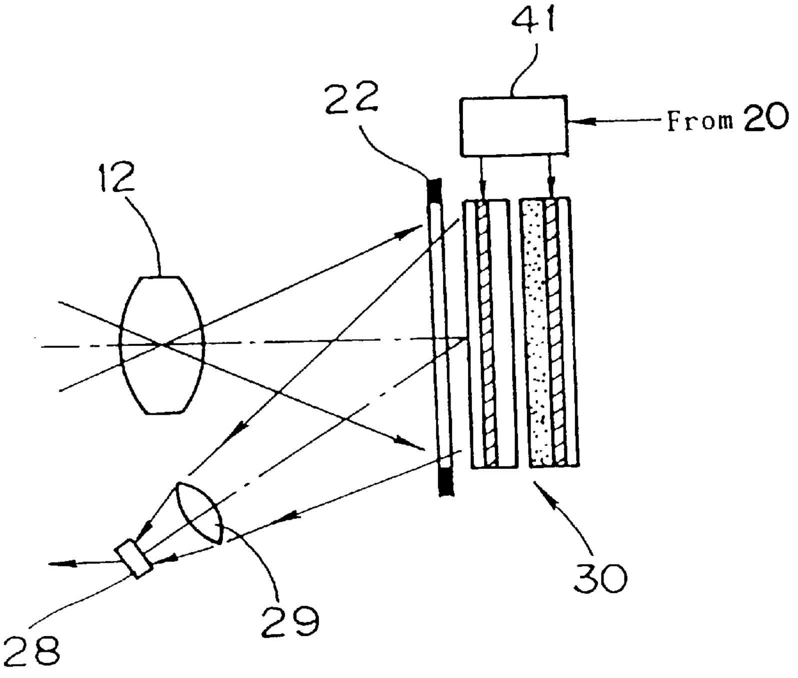
FIG. 8 is a schematic side view of the photographic lens, the first photometering sensor, the condenser lens, the focal-plane shutter and the electronic development type recording medium in the electronic development type camera shown in FIG. 1, showing the path of light which is received by the first photometering sensor when the recording medium is exposed.

As shown in FIG. 8, during an exposure, the shutter 22 is open and the light passed through the photographic lens 12 is reflected on the front surface or light receiving surface of the electronic development type recording medium 30, and a part of the reflected light reaches the first photometering sensor 28 through the condenser lens 29.

It should be noted that the output of the first photometering sensor 28 is used only when the pre-photometering is carried out, and that only the second photometering sensor 51 is used when the main photometering is carried out, in the first embodiment of the present invention.

The photographic operation of the camera of the first embodiment will now be discussed below with reference to the flow chart shown in FIGS. 9 and 10 and the time charts shown in FIGS. 11 and 12.

Figure 9:
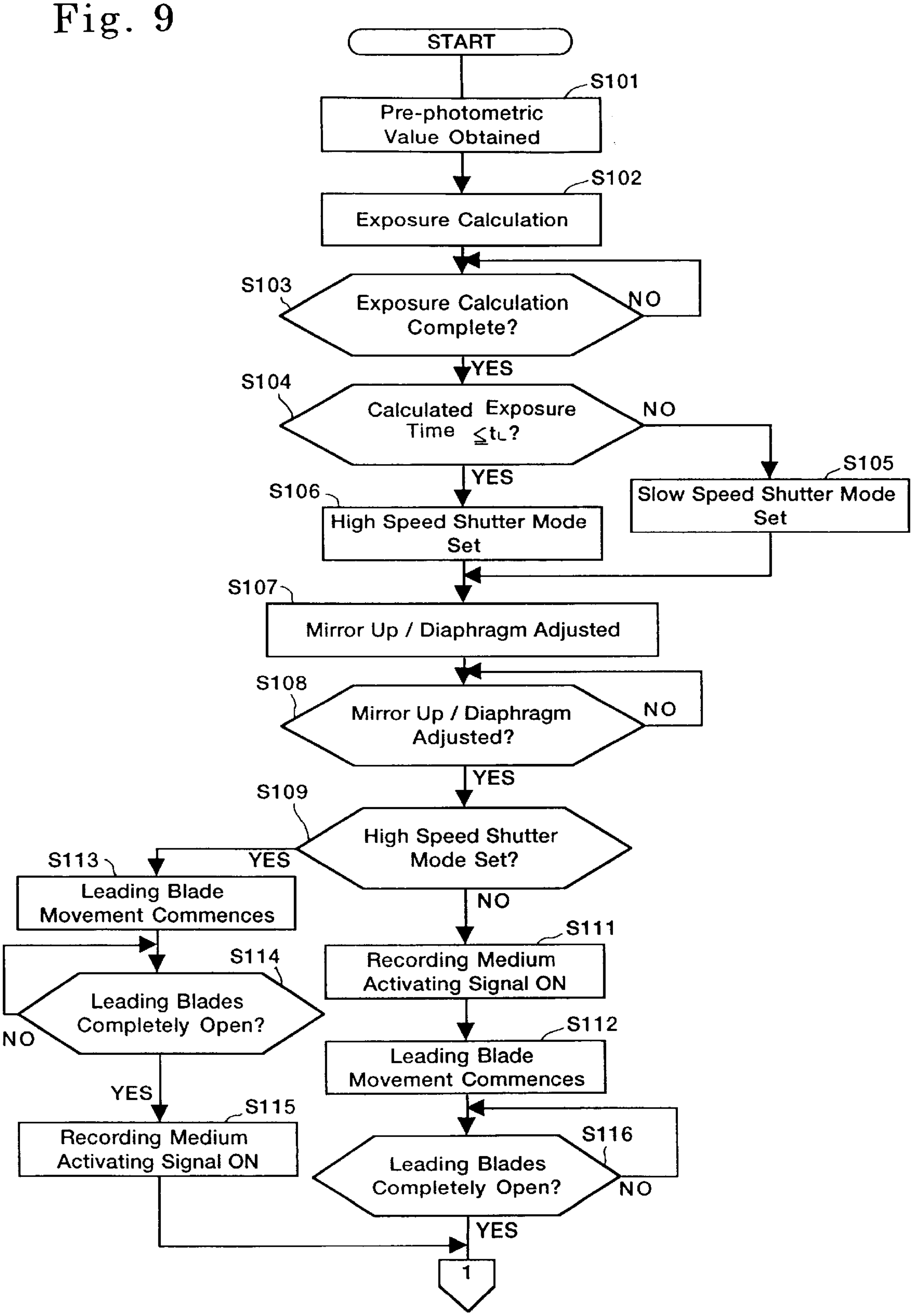
FIGS. 9 and 10 show a flow chart illustrating a photographic operation of the camera shown in FIG. 1.
Figure 10:
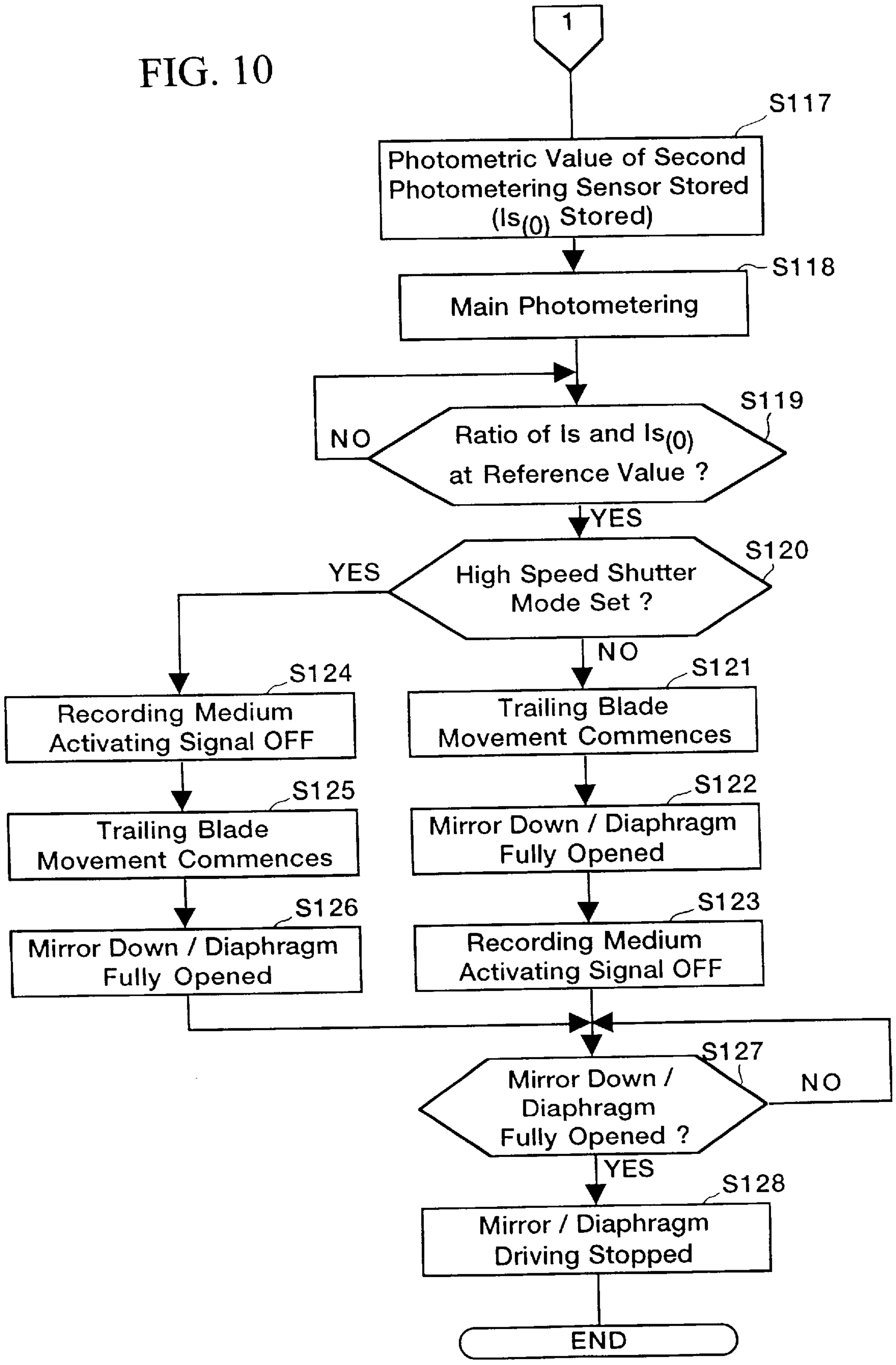
Figure 11:
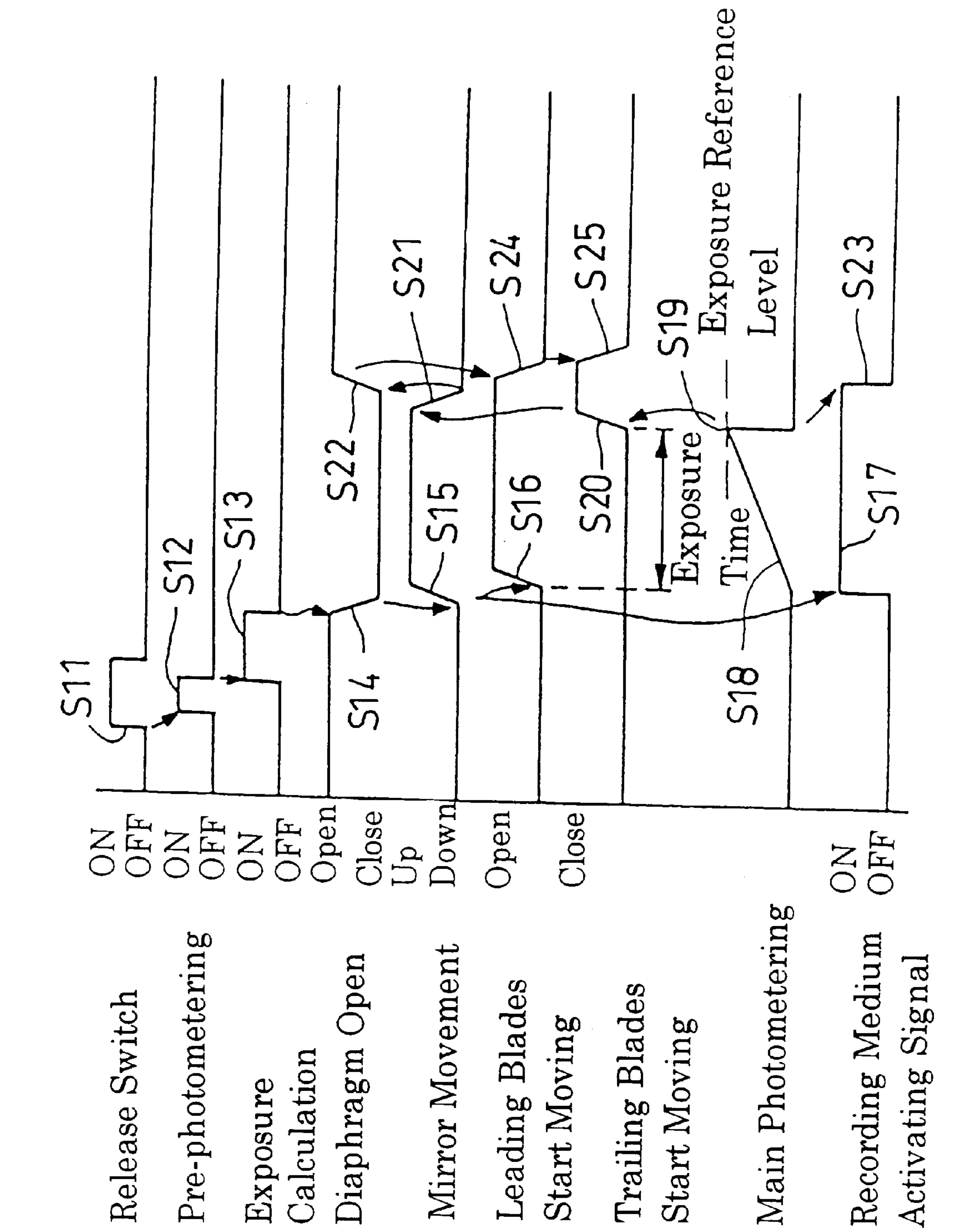
FIG. 11 is a time chart regarding the photographing operation shown in FIGS. 9 and 10 in the case where the calculated shutter speed is greater than a predetermined shutter speed.
Figure 12:
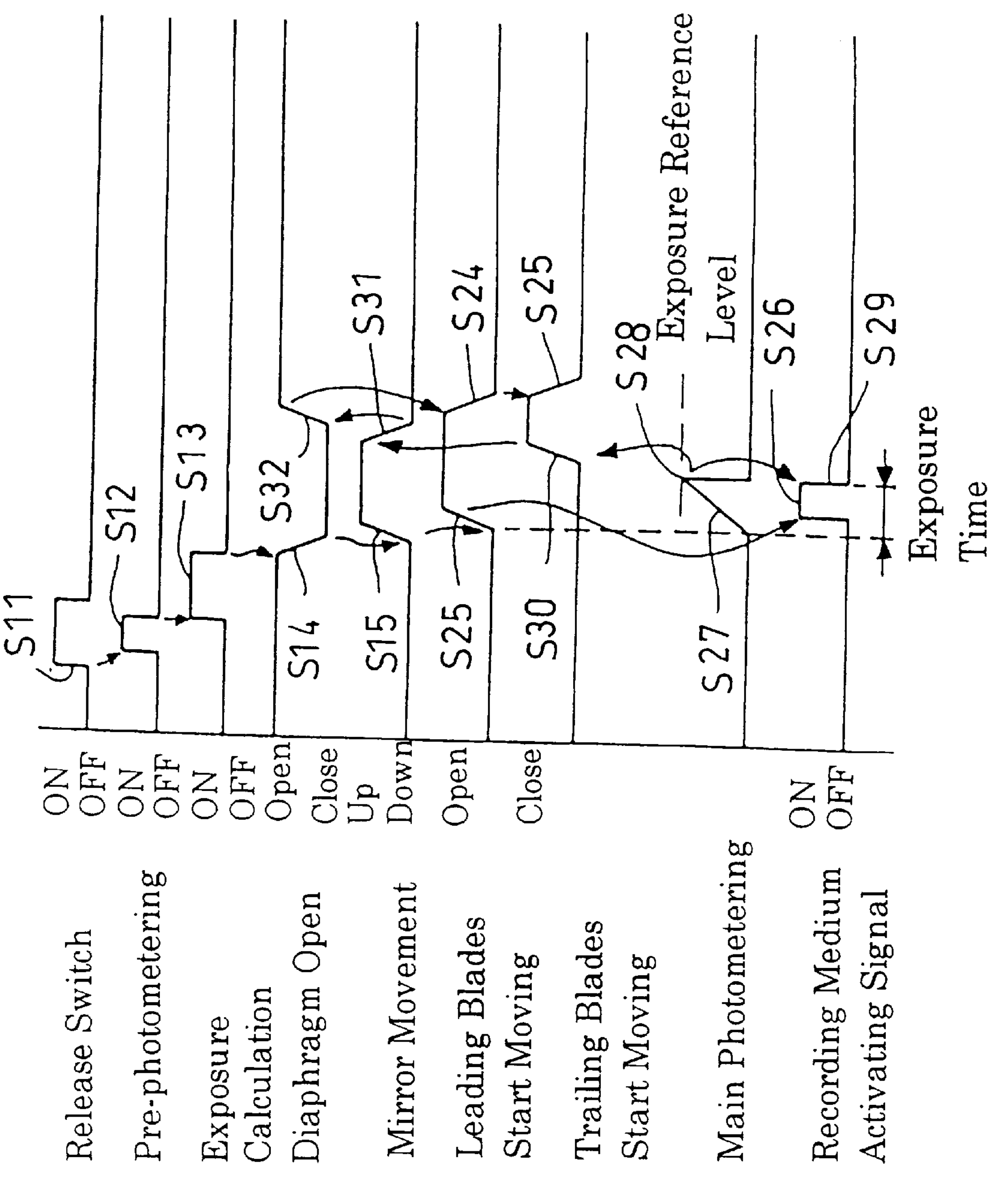
FIG. 12 is a time chart regarding the photographing operation shown in FIGS. 9 and 10 in the case where the calculated shutter speed is less than or equal to the predetermined shutter speed.

Control enters the flow chart shown in FIGS. 9 and 10 when the release switch 14 is operated (S11 shown in FIGS. 11 and 12). Firstly, pre-photometering is performed (S12) and a pre-photometric value is obtained which corresponds to the signals output from the first photometering sensor 28, at step S101 (S12). Thereafter, the exposure calculation is performed, using the obtained pre-photometric value, in which an opening amount of the diaphragm 12*a* and a shutter speed (i.e., exposure time) are calculated, at step S102 (S13). Thereafter, at step S103, whether the exposure calculation has completed is determined. If it is checked at step S103 that the calculation been completed, control proceeds to step S104 to check whether the calculated exposure time is equal to or less than a reference exposure time) $t_L$. Control proceeds to step S106 if the calculated shutter speed is equal to or less than the reference shutter speed $t_L$, or to step S105 if the calculated shutter speed is more than the reference shutter speed $t_L$. The reference shutter speed $t_L$ is predetermined to be slower than a shutter speed which would be necessary for the shutter 22 to carry out a slit exposure. It should be noted, however, that the shutter 22 of the camera disclosed does not perform a slit exposure.

If it is checked at step S104 that the calculated shutter speed is equal to or less than the reference shutter speed $t_L$, the subsequent operations are performed in accordance with the time chart shown in FIG. 11. On the other hand, if it is checked at step S104 that the calculated shutter speed is more than the reference shutter speed $t_L$, the subsequent operations are performed in accordance with the time chart shown in FIG. 12. Firstly, the latter case, i.e., the calculated shutter speed is more than the reference shutter speed $t_L$, will be explained.

In this case, a slow speed shutter mode is set at step S105. Thereafter control proceeds to step S107 to decrease the size of the opening of the diaphragm 12*a* from its fully open state, in accordance with the above-noted opening amount calculated in the exposure calculation (S14), and at the same time, the quick return mirror 21 is moved from its lower position to its upper position (S15). Whether the adjustment of the size of the opening of the diaphragm 12*a* has completed and whether the mirror 21 has completed to be moved up to its upper position are both checked at step S108. When it is checked at step S108 that both have completed, control proceeds to step S109 to check if a high speed shutter mode is set. Control proceeds to step S113 if it is determined at step S109 that the high speed shutter mode is set, or to step S111 if that is not the case. Here, since the slow speed shutter mode has been set at step S105, control proceeds to step S111.

At step S111 a recording medium activating signal that is normally turned OFF is turned ON (S17), so that a predetermined amount of voltage is applied between the electrostatic data recording medium 31 and the electric charge holding medium 32 through the recording medium drive circuit 41. Subsequently, at step S112, the shutter 22 is released (S16), i.e., the leading blades of the shutter 22 start moving, whereby the electronic development type recording medium 30, on which no images have been recorded, is exposed, so that visible subject images are recorded on the electronic development type recording medium 30. It will be appreciated from the foregoing that the shutter 22 is released immediately after voltage is applied to the recording medium 30 and that the shutter release and the voltage application are accordingly carried out almost at the same time. Thereafter, at step S116, whether the leading blades have completely opened is checked, and control proceeds to step S117 when it is determined that the leading blades have completely opened. At step S117, the photometric value (i.e., the above mentioned illuminance $Is_{(0)}$) obtained through the second photometering sensor 51 is stored in the memory 53*g*.

At step S118, the main photometering (i.e., photometering during exposure) is performed (S18). In the main photometering, as discussed above with reference to equations (1) through (12), the signal output from the second photometering sensor 51 is detected and the ratio of the illuminance Is and the illuminance $Is_{(0)}$ is calculated as the data corresponding to the transmittance T. Thereafter, at step S119, it is checked whether the ratio of the illuminance Is and the illuminance $Is_{(0)}$ reaches the calculated reference value, and control proceeds to step S120 when the ratio reaches the calculated reference value (S19).

At step S120, it is checked whether the high speed shutter mode is set. Control proceeds to step S124 if it is determined at step S120 that the high speed shutter mode is set, or to step S121 if that is not the case. Here, since the slow speed shutter mode has been set at step S105, control proceeds to step S121. At step S121 the shutter 22 is closed (S20), i.e., the trailing blades of the shutter 22 start moving. Thereafter, at step S122, the quick return mirror 21 is moved down to its lower position (S21) after the shutter 22 has completely closed, and subsequently, the diaphragm 12*a* is fully opened (S22). Thereafter, the recording medium activating signal is turned OFF at step S123 (S23).

Whether the mirror 21 has completed being moved down to its lower position and whether the diaphragm 12*a* is fully opened are both checked at step S127. When it is determined at step S127 that both have completed, control proceeds to step S128 to stop driving both the mirror 21 and the diaphragm 12*a*, and subsequently, the shutter 22 is charged, while both the leading and trailing blades are reset and held at their initial positions through magnets (not shown). Thereafter control ends.

As can be seen from the foregoing, in the slow speed shutter mode, the time from when the shutter 22 starts to be opened until the time the shutter 22 starts to be closed corresponds to the calculated shutter speed. That is, the exposure time of the recording medium 30 is determined by the shutter speed (i.e., opening time) of the shutter 22.

Next, the former case, i.e., the calculated shutter speed is less than or equal to the reference shutter speed $t_L$ will, now be explained. In this case, a high speed shutter mode is set at step S106. Thereafter control proceeds to step S107 to decrease the size of the opening of the diaphragm 12*a* from its fully open state in accordance with the above-noted opening amount calculated in the exposure calculation (S14), and at the same time, the quick return mirror 21 is moved from its lower position to its upper position (S15). Whether the adjustment of the size of the opening of the diaphragm 12*a* has completed and whether the mirror 21 has completed to be moved up to its upper position are both checked at step S108. When it is checked at step S108 that both have completed, control proceeds to step S109 to check if a high speed shutter mode is set. Here, since the high speed shutter mode has been set at step S106, control proceeds to step S113.

At step S113 the shutter 22 is released (S25), i.e., the leading blades of the shutter 22 start moving, whereby the electronic development type recording medium 30, on which no images have been recorded, is exposed. It is then checked whether the leading blades have completely opened, at step S114, and control proceeds to step S115 when it is checked that the leading blades of the shutter have completely opened.

At step S115 the recording medium activating signal is turned ON (S26), so that a predetermined amount of voltage is applied between the electrostatic data recording medium 31 and the electric charge holding medium 32 through the recording medium drive circuit 41. Subsequently, at step S117, the photometric value (i.e., the above mentioned illuminance $Is_{(0)}$) obtained through the second photometering sensor 51 is stored in the memory 53*g*.

At step S118, the main photometering is performed (S27). In case of the high speed shutter mode being set at step S106, the signal output from the second photometering sensor 51 is detected and the ratio of the illuminance Is and the illuminance $Is_{(0)}$ is detected as the data corresponding to the transmittance T after the shutter 22 has been completely opened.

Thereafter, at step S119, it is checked whether the ratio of the illuminance Is and the illuminance $Is_{(0)}$ has reached the calculated reference value, and control proceeds to step S120 when the ratio has reached the calculated reference value (S28).

At step S120, it is checked whether the high speed shutter mode is set. Here, since the high speed shutter mode has been set at step S106, control proceeds to step S124.

At step S124 the recording medium activating signal is turned OFF (S29), and subsequently, at step S125, the shutter 22 is closed (S30), i.e., the trailing blades of the shutter 22 start moving. Thereafter, at step S126, the quick return mirror 21 is moved down to its lower position (S31) after the shutter 22 has completely closed, and subsequently, the diaphragm 12*a* is fully opened (S32).

Thereafter, whether the mirror 21 has completed to be moved down to its lower position and whether the diaphragm 12*a* has fully opened are both checked at step S127. When it is checked at step S127 that both have completed, control proceeds to step S128 to stop driving both the mirror 21 and the diaphragm 12*a*, and subsequently, the shutter 22 is charged while both the leading and trailing blades are reset and held at their initial positions through magnets (not shown). Thereafter control ends.

As can be seen from the foregoing, in the high speed shutter mode, the time from when the recording medium activating signal is turned ON until the time the recording medium activating signal is turned OFF corresponds to the calculated shutter speed. That is, the exposure time of the recording medium 30 is determined by the time from when the recording medium activating signal is turned ON until the time the recording medium activating signal is turned OFF, but is not determined by the shutter speed of the shutter 20, unlike in the slow speed shutter mode.

Preferably, the high speed shutter mode is selected rather than the slow speed shutter mode whenever the exposure control for the electronic development type recording medium 30 in the high speed shutter mode is operable.

As can be understood from the foregoing, according to the first embodiment of the present invention, the ratio of the illuminance Is and the illuminance $Is_{(0)}$ is detected as the data corresponding to the transmittance T of the electronic development type recording medium 30, by way of detecting the amount of light passed through the recording medium 30 by the second photometering sensor 51, firstly, at the moment the exposure starts and, secondly, during the exposure (i.e., the time between after the exposure starts and before the exposure finishes), and the exposure of the recording medium 30 is controlled in accordance with the obtained ratio, thereby precise exposure control can be achieved even if there are variations in the illuminance of image surface If, the sensitivity and the gamma of the recording medium 30.

In the above embodiment, when in the slow speed shutter mode, after it has been checked at step S108 that the adjustment of the size of the opening of the diaphragm 12*a* has completed and that the mirror 21 has completed to be moved up to its upper position, the recording medium activating signal is turned ON, and subsequently, the shutter 22 is released. Due to this control, the occurrence of fogging in the unexposed portion can be effectively prevented since voltage is applied to the recording medium 30 immediately before the shutter 22 is released. On the other hand, when in the high speed shutter mode, the recording medium activating signal is turned ON immediately after it has been checked at step S114 that the shutter 22 is fully opened, and subsequently, the recording medium activating signal is turned OFF immediately before the shutter 22 starts to be closed. According to this control, similar to the case of the slow speed shutter mode being set, the occurrence of fogging in the unexposed portion can be effectively prevented.

Furthermore, in the above embodiment of the present invention, when the high speed shutter mode is set, the recording medium activating signal is turned ON and OFF with the shutter 22 fully opened, that is, an electronic shutter is used for exposure. According to this control, even in the high speed shutter mode, subject light passing through the photographic lens 12 is always incident upon the entire light receiving surface of the recording medium 30 during exposure, thereby the light receiving surface of the recording medium 30 is uniformly exposed, resulting in a high precision exposure control for the electronic development type recording medium 30. Still furthermore, when the high speed shutter mode is set, since the slit exposure is not performed, it is not required to precisely and accurately control the shutter 22, thus the control for the shutter 22 is simple.

Figure 14:
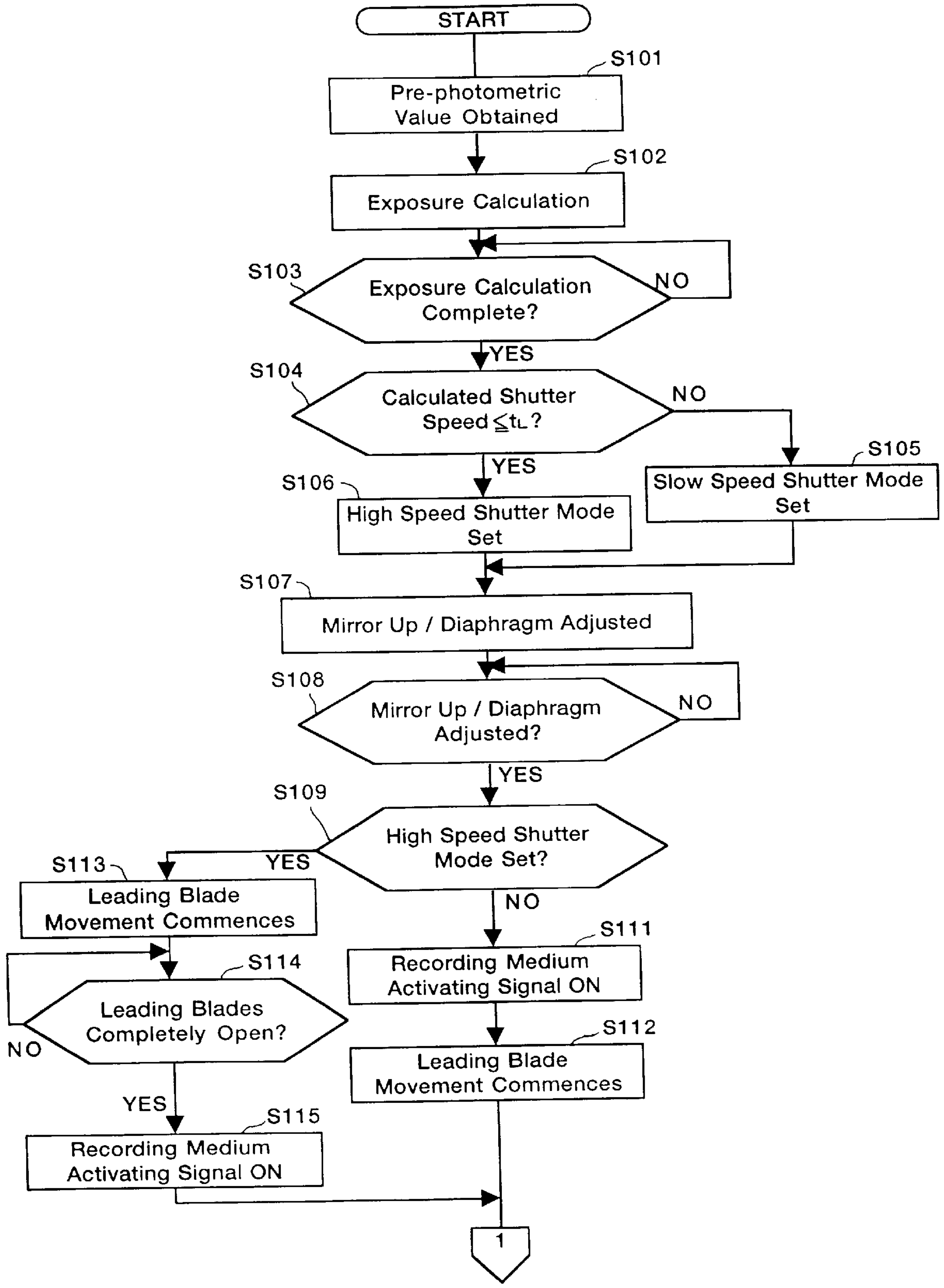
FIGS. 14 and 15 show a flow chart illustrating a photographic operation of the camera shown in FIG. 1, according to the second embodiment of the present invention.
Figure 15:
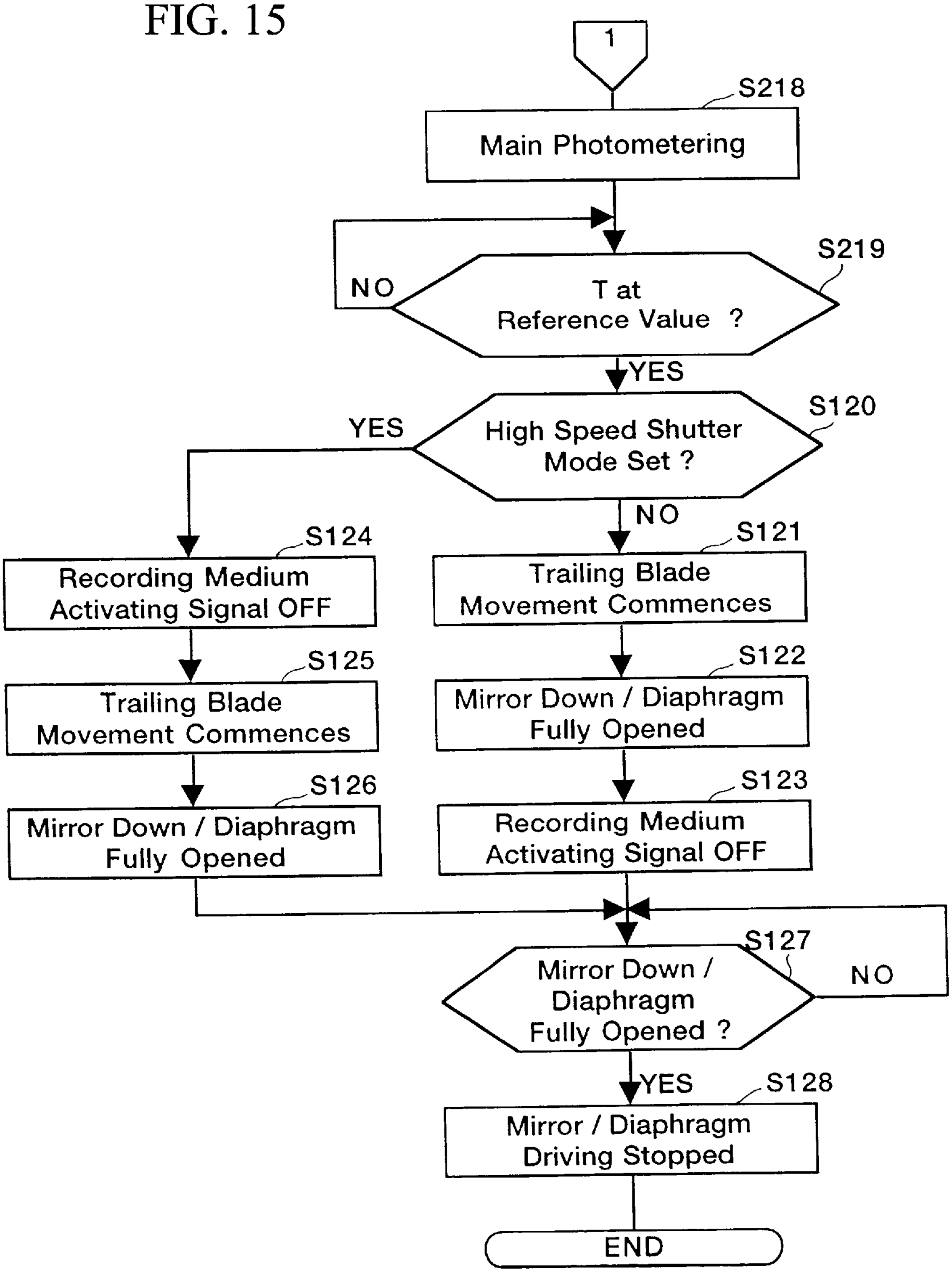

The second embodiment of the camera shown in FIG. 1 will now be discussed below. In this second embodiment, the photometering circuit 53 of the first embodiment is replaced by a photometering circuit 53' (shown in FIG. 13) which is slightly different from the photometering circuit 53 of the first embodiment. Specifically, the photometering circuit 53' of the second embodiment has no memory corresponding to the memory 53*g* of the first embodiment between the A/D converter 53*d* and the difference circuit 53*e*, and the A/D converter 53*c* is connected to both the difference circuit 53*e* and the system controller 20 in the second embodiment. Except for these differences, the photometering circuit 53' is the same as the photometering circuit 53. Furthermore, as shown in FIGS. 14 and 15, the photographic operation of the second embodiment does not have operations corresponding to those at steps S116 and S117 in the flow chart shown in FIGS. 9 and 10, and the operations at steps S118 and S119 in the flow chart shown in FIGS. 9 and 10 are replaced by the operations at steps S218 and S219, respectively. The remaining structure in the second embodiment is the same as that of the first embodiment.

In the second embodiment, a first photometric data, which corresponds to the illuminance If (i.e., illuminance of the image surface of the recording medium 30) is detected by the first photometering sensor 28, and a second photometric data which corresponds to the illuminance Is (i.e., illuminance of light passed through the recording medium 30 after exposure is commenced) is detected by the second photometering sensor 51. The exposure is completed when it is detected that the ratio of the detected illuminance Is and the illuminance If has reached a reference value, with a judgement that the optimum transmittance $T_{(opt)}$ has been obtained.

The fundamental concept of the exposure control in the second embodiment of the present invention will be hereinafter explained.

In the case where the illuminance If is a function over time, the exposure amount to the recording medium is obtained by the following equation (13):

$$H = \int If \times dt \tag{13}$$

Hence, the optimum exposure amount $H_{(opt)}$ is defined by the the following equation (14):

$$H_{(opt)} = \int_0^t If \times dt \tag{14}$$

The exposure time t and the illuminance If are determined such that the exposure amount H becomes the optimum exposure amount $H_{(opt)}$.

In the case where the recording medium is a light-transmissible type recording medium, e.g., the electronic development type recording medium 30, the transmittance varies in accordance with variations in the exposure amount H. Therefore, in order to obtain the optimum exposure amount $H_{(opt)}$ for the electronic development type recording medium 30, the exposure time t needs to be determined such that the value of transmittance becomes an optimum value.

The transmittance of the electronic development type recording medium 30 can be defined by equation (2) (T=k×H) or equation (3) (T=k×If×t), as noted above. Here it is assumed that "$T_{(opt)}$" is the optimum transmittance, thus the following equation (15) is defined:

$$T_{(opt)} = k \times H_{(opt)} = k \times \int_0^t If \times dt \tag{15}$$

Therefore, the exposure time t is determined such that the transmittance T becomes the optimum transmittance $T_{(opt)}$.

The illuminance of light passed through the electronic development type recording medium 30 after it starts to be developed is defined by equation (5) (Is=T×If), as noted above. Here it is assumed that the optimum transmittance $T_{(opt)}$ is obtained the moment after a time t1 elapses after exposure commences, thus the following equation (16) is defined:

$$T_{(opt)} = Is_{(t1)} / If \tag{16}$$

The first photometric data detected by the first photometering sensor 28 corresponds to the amount of electric current, which varies depending upon the intensity of light that is incident upon the light receiving surface of the electronic development type recording medium 30. This amount of electric current is logarithmic-transformed while converted into voltage. That is, the voltage that is obtained in accordance with the photometric data detected by the first photometering sensor 28 is defined by the following equation (17):

$$V1 = \log(\alpha 1 \times R \times If) \tag{17}$$

wherein "V1" represents the voltage that is obtained in accordance with the photometric data detected by the first photometering sensor 28,

- "α1" represents a proportional fixed number which is determined by the characteristics of the first photometering sensor 28, and
- "R" represents the reflectivity of the light receiving surface of the electronic development type recording medium.

The second photometric data detected by the second photometering sensor 51 corresponds to the amount of electric current, which varies depending upon the intensity of light passed through the electronic development type recording medium 30. This amount of electric current is logarithmic-transformed while converted into voltage. That is, the voltage that is obtained in accordance with the photometric data detected by the second photometering sensor 51 is defined by the following equation (18):

$$V2 = \log(\alpha 2 \times T \times If) \tag{18}$$

wherein "V2" represents the voltage that is obtained in accordance with the second photometric data detected by the second photometering sensor 51, and

- "α2" represents a proportional fixed number which is determined by the characteristics of the second photometering sensor 51.

Accordingly, the optimum transmittance $T_{(opt)}$ of equation (16) can be obtained by calculating the difference between equations (7) and (8), that is, by calculating the following equation (19):

$$V2-V2=\log(T_{(opt)})+\log(\alpha 2/(\alpha 1\times R)) \quad (19)$$

The value of "$\log(T_{(opt)})+\log(\alpha 2/(\alpha 1\times R))$" in equation (19) is stored as a reference value. This reference value is calculated, using the proportional fixed values α1, α2, the reflectivity R and the optimum transmittance $T_{(opt)}$, and is prestored in a memory provided in the system controller 20. With this arrangement, according to the second embodiment of the present invention, the exposure of the recording medium 30 is completed the moment the value of "V2−V1" reaches the prestored reference value determined by equation (19) to thereby obtain the optimum exposure amount $H_{(opt)}$ for the recording medium 30.

Figure 13:
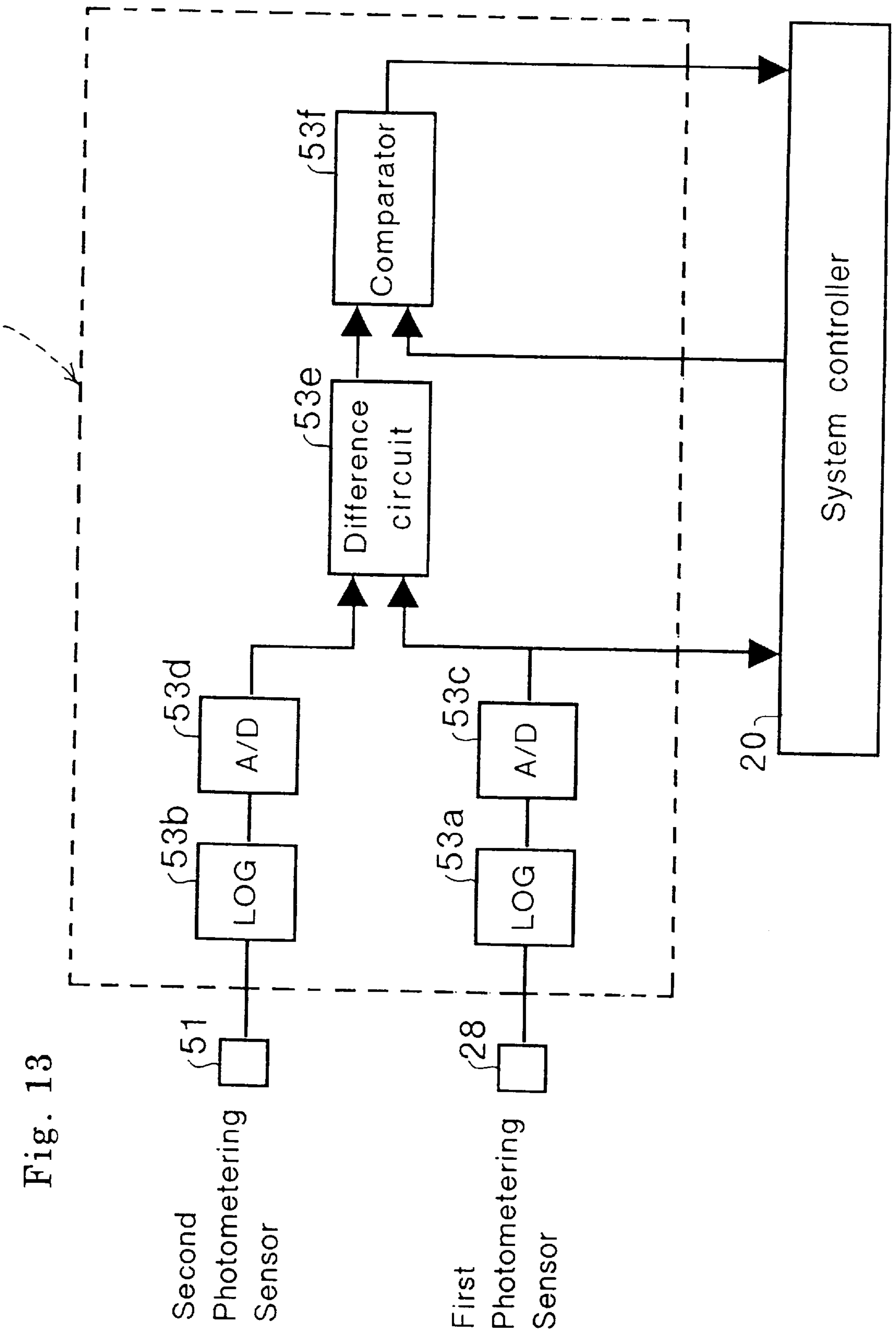
FIG. 13 is a block diagram of the photometering circuit in the camera shown in FIG. 1, according to a second embodiment of the present invention.

FIG. 13 shows a block diagram of the photometering circuit 53' which performs the above-explained exposure control of the second embodiment of the present invention. As shown in FIG. 13, the photometering circuit 53' is not provided with a memory corresponding to the memory 53*g* of the first embodiment between the A/D converter 53*d* and the difference circuit 53*e*, as noted above.

The current value (i.e., first photometering data) that corresponds to the signal output from the first photometering sensor 28 is logarithmic-transformed and converted into the voltage V1 through the first logarithmic transforming circuit 53*a* (see equation (17)), and subsequently, converted into digital signals through the first A/D converter 53*c*. These digital signals are inputted to both the difference circuit 53*e* and the system controller 20. The digital signals that are output from the first A/D converter 53*c* are input to the system controller 20 as the photometric data obtained during pre-photometering. Upon pre-photometering, e.g., when the release switch 14 is half-depressed, photometric information is visually displayed on the indicating panel 68 in accordance with the above obtained photometric data, and the opening of the diaphragm 12*a* is adjusted in accordance with the photometric data.

The current value (i.e., second photometering data) that corresponds to the signal output from the second photometering sensor 51 is logarithmic-transformed and converted into the voltage V2 through the second logarithmic transforming circuit 53*b* (see equation (18)), and subsequently, converted into digital signals through the second A/D converter 53*d*. These digital signal are inputted to the difference circuit 53*e*. In the difference circuit 53*e* the difference between the voltages V1 and V2, i.e., the control value corresponding to the transmittance T is calculated. In the comparator 53*f* the signal that corresponds to the calculated control value is compared with the stored reference value (the value of "$\log(T_{(opt)}) +\log(\alpha 2/(\alpha 1\times R))$" in equation (19)). When it is determined that the signal corresponding to the calculated control value becomes equal to the stored reference value as a result of the comparison, the system controller 20 controls the shutter drive circuit 26 to close the shutter 22 through the exposure control circuit 27 with a judgement that the exposure amount for the electric development type recording medium 30 has reached the optimum exposure amount.

FIGS. 14 and 15 show a flow chart illustrating the photographic operation of the camera of the second embodiment of the present invention. As noted above, the photographic operation of the second embodiment is different from that of the first embodiment in that, in the second embodiment, there are not provided the operations after step S112 which correspond to the operations at steps S116 and S117 in the first embodiment, and the operations in the first embodiment at steps S118 and S119 shown in FIG. 10 are replaced by operations at steps S218 and S219 as shown in FIG. 15, respectively. Except for these differences, the photographic operation of the first embodiment is the same as that of the second embodiment. The time charts of the second embodiment are identical to those of the first embodiment shown in FIGS. 11 and 12. Therefore, the time charts of the second embodiment are omitted. Only those areas of the second embodiment different from the first embodiment, i.e., the operations at steps S218 and S219, will now be discussed.

At step S218, the main photometering is performed (S18). In this main photometering, as discussed above, the signals output from the first and second photometering sensors 28 and 51 are detected and the transmittance T is calculated. Thereafter, at step S219, it is checked whether the calculated transmittance T reaches the calculated reference value, and control proceeds to step S120 when the calculated transmittance T reaches the calculated reference value (S19).

As can be understood from the foregoing, according to the second embodiment of the present invention, the transmittance T of the electronic development type recording medium 30 is detected, by way of detecting the amount of light reflected on the light receiving surface of the recording medium 30 by the first photometering sensor 28 and also detecting the amount of light passed through the recording medium 30 by the second photometering sensor 51, and the exposure of the recording medium 30 is controlled in accordance with the obtained transmittance T, thereby a precise exposure control can be achieved even if there are variations in the illuminance of image surface If, the sensitivity and the gamma of the recording medium 30.

In the second embodiment, the first photometering sensor 28 is used during both pre-photometering, in which the first photometering sensor 28 detects the light reflected on the front surface of the shutter 22, and during main photometering, in which the first photometering sensor 28 detects the illuminance Is, which contributes to a reduction in the number of elements constituting the camera, i.e., the structure of the camera is simplified.

Figure 16:
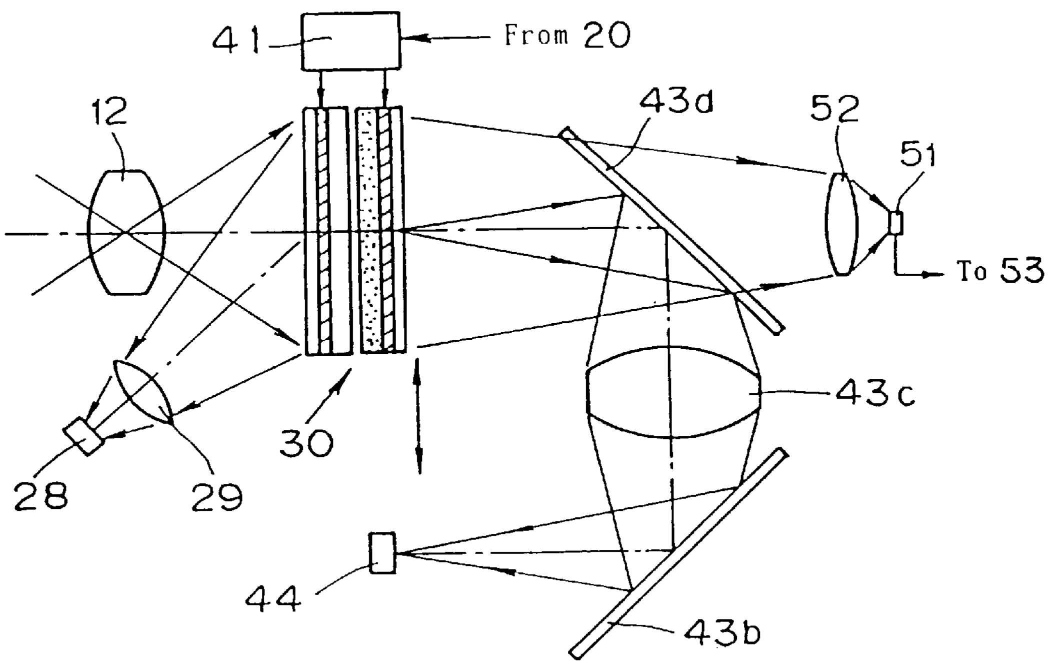
FIG. 16 shows a schematic side view of important parts to be provided in the camera shown in FIG. 1, according to a third embodiment of the present invention.

FIG. 16 shows a third embodiment of the camera shown in FIG. 1. In this third embodiment, the configuration of the scanning optical system is different from that in the first embodiment, and a semitransparent mirror or half mirror 43*d* is used instead of the mirror 43*a* used in the first embodiment. Except for these differences, the camera of the third embodiment is the same as that of the first embodiment.

In the third embodiment, the half mirror 43*d* is placed between the electronic development type recording medium 30 and the condenser lens 52. Therefore, the second photometering sensor 51 detects the light passed through the half mirror 43*d* and the condenser lens 52. On the other hand, the first photometering sensor 28 detects the light reflected upon the light receiving surface of the recording medium 30 or reflected upon the front surface of the shutter 22 (not shown in FIG. 16), similar to the first embodiment. Effects similar to those in the first embodiment can also be obtained according to the third embodiment.

Figure 17:
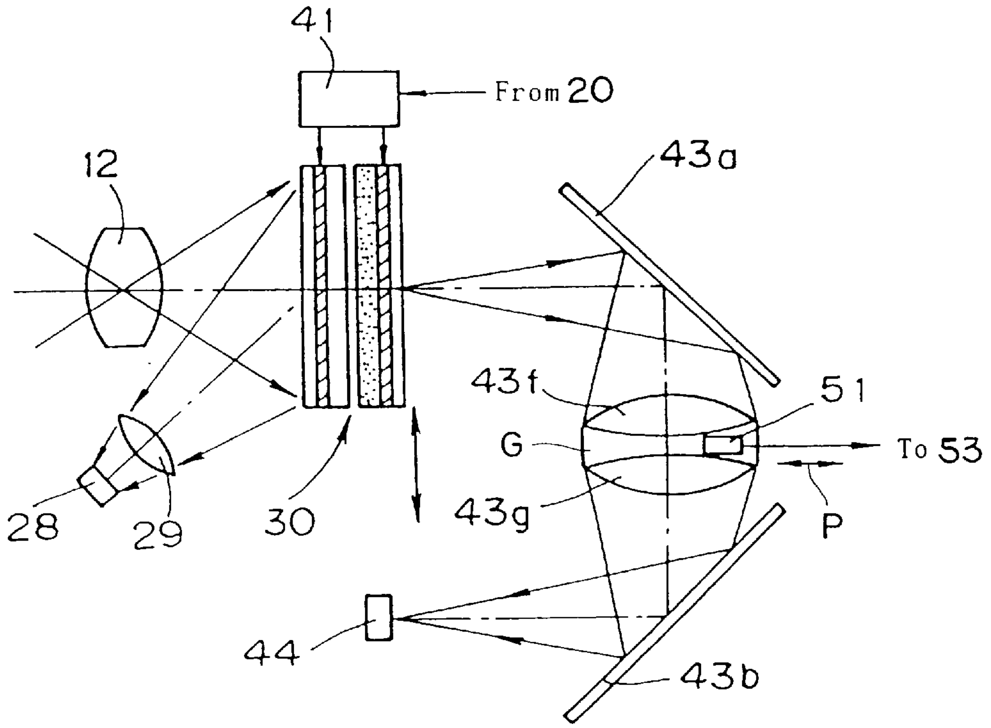
FIG. 17 shows a schematic side view of important parts to be provided in the camera shown in FIG. 1, according to a fourth embodiment of the present invention.

FIG. 17 shows a fourth embodiment of the camera shown in FIG. 1. In this fourth embodiment, the configuration of the scanning optical system is different from that in the first embodiment. The light passed through the recording medium 30 is incident upon the mirror 43*a*. A pair of lenses 43*f* and 43*g* are provided between the mirrors 43*a* and 43*b* with a predetermined gap G formed therebetween, instead of lens 43*c* used in the first embodiment. Furthermore, no lens corresponding to the condenser lens 52 used in the first embodiment is provided in the fourth embodiment.

The second photometering sensor 51 is guided in the direction shown by an arrow P so that the second photometering sensor 51 may be inserted into (as shown in FIG. 17) and retracted from the gap G. The second photometering sensor 51 is driven to move in the direction P by a moving device (not shown) and is inserted into the gap G when the photometering operation is carried out, or retracted from the gap G when the visible subject image developed on the recording medium is read through the light source 44. Except for the differences noted above, the camera of the fourth embodiment is the same as that of the first embodiment.

In the fourth embodiment, the light reflected upon the mirror 43*a* is not converged but is converted into parallel beams of light through the lens 43*f*. Therefore, the second photometering sensor 51 receives a smaller amount of light compared to the case of the first embodiment where the second photometering sensor 51 receives the light converged by the condenser lens 52. However, the output from the second photometering sensor 51 merely becomes small. Therefore, in the fourth embodiment, the second photometering sensor 51 can photometer the subject light passed through the entire recording medium, similar to the first embodiment.

Figure 18:
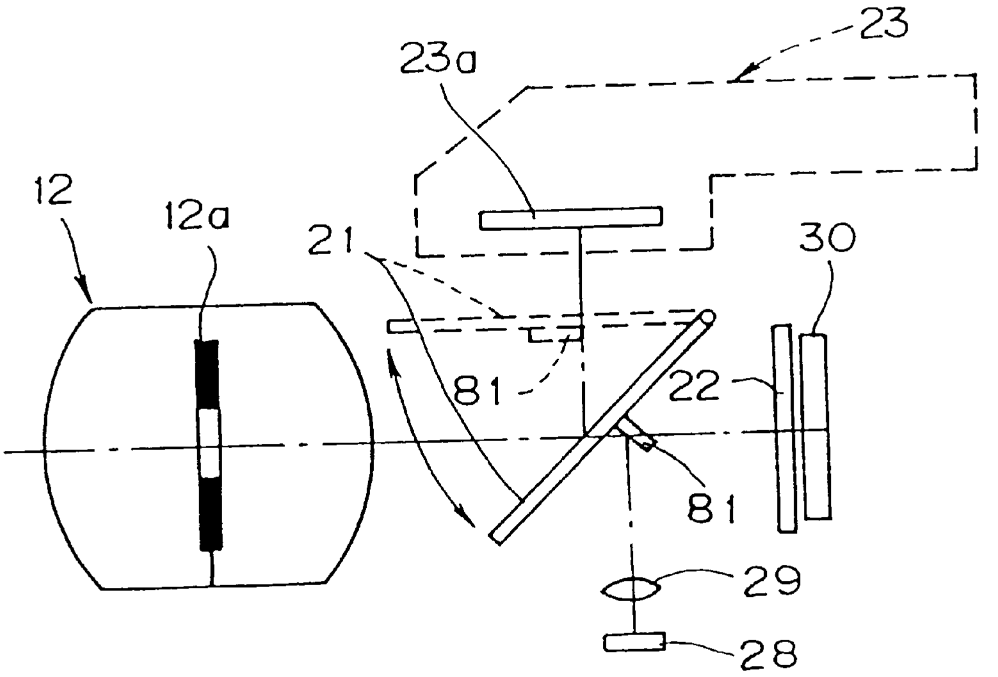
FIG. 18 shows a schematic side view of important parts to be provided in the camera shown in FIG. 1, according to a fifth embodiment of the present invention.

FIG. 18 shows a fifth embodiment of the camera shown in FIG. 1. In this fifth embodiment, the quick-return mirror 21 is provided, on the back surface thereof, with a sub-mirror 81 which is pivoted on a horizontal axis fixed on the back surface of the mirror 21. The sub-mirror 81 is rotated and moved up to be placed at its retracted position (shown by the dotted lines) when the quick return mirror 21 is rotated and moved up to its retracted position, while the sub-mirror 81 is rotated and moved down to be placed at its operating position (shown by the solid line) when the quick return mirror 21 is moved down to its lower position. When the sub-mirror 81 is at the operating position, a part of the light passed through the photographic lens 12 reaches the first photometering sensor 28 through the condenser lens 29. The remaining structure of the fifth embodiment is the same as that of the first embodiment.

Figure 19:
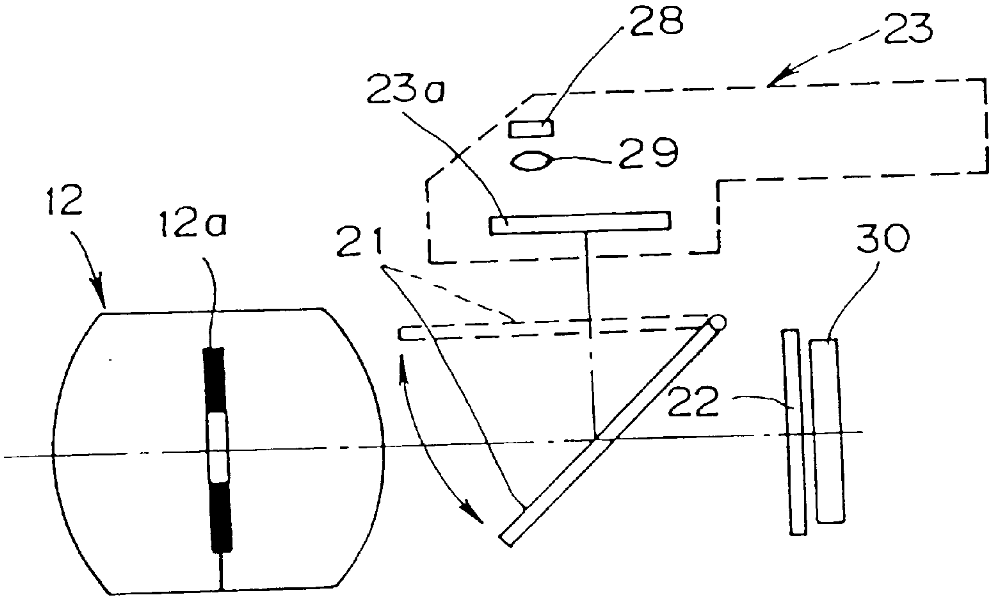
FIG. 19 shows a schematic side view of important parts to be provided in the camera shown in FIG. 1, according to a sixth embodiment of the present invention.

FIG. 19 shows a sixth embodiment of the camera shown in FIG. 1. In the sixth embodiment, the first photometering sensor 28 and the condenser lens 29 are provided inside the finder 23 at respective positions where the light of images (image light) seen through the finder 23 is not eclipsed by the sensor 28 or the lens 29. The remaining structure of the sixth embodiment is the same as that of the first embodiment.

Although a specific type of electronic development type recording medium 30 is used in the above illustrated embodiments, any other electronic type recording medium having a different structure from the recording medium 30 may be used for the camera to which the present invention is applied instead.

As can be seen from the foregoing, according to the present invention, a high precision exposure control for an electronic development type recording medium can be achieved.

Obvious changes may be made in the specific embodiments of the present invention described herein, such modifications being within the spirit and scope of the invention claimed. It is indicated that all matter contained herein is illustrative and does not limit the scope of the present invention.

I claim:

1. An exposure control apparatus for an electronic development type camera having a photographic optical system, said camera using a recording medium in which subject images formed through said photographic optical system are electrically developed, said exposure control apparatus comprising:

a detecting system, said detecting system detecting a first photometric data which corresponds to subject light passed through said recording medium upon commencement of an exposure of said recording medium, said detecting system further detecting a second photometric data which corresponds to said subject light passed through said recording medium during exposure of said recording medium, said first photometric data corresponding to a transmittance of said recording medium upon commencement of exposure;

a first optical system positioned behind the recording medium so that light passing through the recording medium is made parallel by said first optical system, said photometering sensor being positioned behind said first optical system;

a calculating system, said calculating system calculating an optimum transmittance of said recording medium after said exposure commences, in accordance with a ratio of said first photometric data and said second photometric data; and a control system, said control system controlling said exposure of said recording medium in accordance with said optimum calculated transmittance.

2. The exposure control apparatus of claim 1, wherein said camera includes a focal-plane shutter, the recording medium positioned behind the focal-plane shutter, said photometering sensor positioned behind the recording medium.

3. The exposure control apparatus of claim 1, wherein said control system stops said exposure when said calculated transmittance reaches a predetermined reference value.

4. The exposure control apparatus of claim 3, wherein said predetermined reference value is calculated using a fixed value, a transmittance of said recording medium when said exposure of said recording medium commences, and an optimum transmittance of said recording medium said fixed value being determined by a characteristic of said photometering sensor.

5. The exposure control apparatus of claim 1, further comprising a memory for storing said first photometric data, wherein said calculating system calculates said transmittance by comparing said first photometric data stored in said memory with said second photometric data.

6. The exposure control apparatus of claim 1, wherein said calculating system calculates a first logarithmic value corresponding to said first photometric data and a second logarithmic value corresponding to said second photometric data, and further calculates said transmittance as a difference between said first and second logarithmic values.

7. The exposure control apparatus of claim 2, wherein said camera is positioned with a semitransparent mirror between said recording medium and said photometering sensor, and wherein said photometering sensor receives light passed through said semitransparent mirror.

8. The exposure control apparatus of claim 2, wherein said camera is positioned with a mirror behind said recording medium, and wherein said detecting system receives light reflected by said mirror.

9. The exposure control apparatus of claim 1, wherein said recording medium comprises an electrostatic data recording medium in which an electric charge corresponding to a subject image is produced, and an electric charge holding medium in which said subject image is visually developed in accordance with said electric charge and which maintains said developed subject image, and wherein said electrostatic data recording medium and said electric charge holding medium each allow said subject light passed through said recording medium to pass therethrough.

10. The exposure control apparatus of claim 9, wherein said electric charge holding medium comprises a dispersive-type liquid crystal display element.

11. The exposure control apparatus of claim 1, wherein said camera is provided with a focal-plane shutter behind which said recording medium is positioned, and wherein said exposure control apparatus further comprises a second detecting system, said second detecting system detecting subject light passed through said photographic optical system and reflected upon a front surface of said focal-plane shutter during a pre-photometering, said second detecting system comprising a photometering sensor provided in front of said focal-plane shutter and outside an optical path of said photographic optical system.

12. The exposure control apparatus of claim 1, further comprising a voltage applying system, said voltage applying system applying a voltage to said recording medium, wherein said voltage applying system starts applying said voltage and subsequently stops applying said voltage to said recording medium while a shutter of said camera is fully open when said shutter is driven with an exposure time which is equal to or less than a predetermined reference exposure time.

13. The exposure control apparatus according to claim 1, further comprising a second optical system, said second optical system being positioned behind said photometering sensor, said first optical system and said second optical system comprising an imaging forming optical system that reimages the subject images at a predetermined position.

14. The exposure control apparatus according to claim 13, further comprising a line sensor positioned at said predetermined position to form the subject images on said line sensor, said photometering sensor being positioned between said first and second optical systems of said image forming optical system when a recording operation of subject images through said photographing lens is performed, said photometering sensor being retracted from said image forming optical system when a reading operation is performed utilizing said line sensor.

15. An exposure control apparatus for an electronic development type camera having a photographic optical system, said camera using a recording medium in which subject images formed through said photographic optical system are electrically developed, said exposure control apparatus comprising:

a first photometering sensor for detecting a first photometric data corresponding to subject light incident upon said recording medium, said first photometric data corresponds to an intensity of subject light reflected upon a light receiving surface of said recording medium;

a second photometering sensor for detecting a second photometric data corresponding to subject light passed through said recording medium, said second photometric data corresponds to an intensity of said subject light passed through said recording medium;

a calculating system, said calculating system calculating a transmittance of said recording medium after an exposure commences, by forming a ratio of said first photometric data to said second photometric data; and a control system, said control system controlling said exposure of said recording medium in accordance with said calculated transmittance.

16. The exposure control apparatus of claim 15, wherein said control system stops said exposure when said calculated transmittance reaches a predetermined reference value.

17. The exposure control apparatus of claim 16, wherein said predetermined reference value is calculated using a first fixed value, a second fixed value, a reflectivity of a light receiving surface of said recording medium, and an optimum transmittance of said recording medium, said first fixed value being determined by a characteristic of said first photometering sensor and said second fixed value being determined by a characteristic of said second photometering sensor.

18. The exposure control apparatus of claim 15, wherein said calculating system calculates a first logarithmic value corresponding to said first photometric data and a second logarithmic value corresponding to said second photometric data, and further calculates said transmittance as a difference between said first and second logarithmic values.

19. The exposure control apparatus of claim 15, wherein said first photometering sensor is also further actuated for photometering subject light during a pre-photometering operation.

20. The exposure control apparatus of claim 19, further comprising a focal-plane shutter, wherein said first photometering sensor receives subject light passed through said photographic optical system and reflected from a front surface of said focal-plane shutter during said pre-photometering operation.

21. The exposure control apparatus of claim 15, wherein said camera is provided with a focal-plane shutter behind which said recording medium is placed, and wherein said first photometering sensor is placed in front of said focal-plane shutter and outside an optical path of said photographic optical system.

22. The exposure control apparatus of claim 15, wherein said second photometering sensor is placed behind said recording medium.

23. The exposure control apparatus of claim 22, further comprising a condenser lens which introduces said subject light passed through said recording medium to said second photometering sensor.

24. The exposure control apparatus of claim 15, wherein said camera is provided with a semitransparent mirror positioned between said recording medium and said second photometering sensor, and wherein said second photometering sensor receives light passed through said semitransparent mirror.

25. The exposure control apparatus of claim 15, wherein said camera is positioned with a mirror behind said recording medium, and wherein said second photometering sensor receives light reflected upon said mirror.

26. The exposure control apparatus of claim 15, wherein said recording medium comprises an electrostatic data recording medium in which an electric charge corresponding to a subject image is produced, and an electric charge holding medium in which said subject image is visually developed in accordance with said electric charge and which maintains said developed subject image, and wherein said electrostatic data recording medium and said electric charge holding medium each allow said subject light passed through said recording medium to pass therethrough.

27. The exposure control apparatus of claim 26, wherein said electric charge holding medium comprises a dispersive-type liquid crystal display element.

28. The exposure control apparatus of claim 15, further comprising a voltage applying system, said voltage applying system applying a voltage to said recording medium, wherein said voltage applying system starts applying said voltage and subsequently stops applying said voltage to said recording medium while a shutter of said camera is fully open when said shutter is driven with an exposure time which is equal to or less than a predetermined reference exposure time.

29. An exposure control apparatus for an electronic development type camera having a photographic optical system, said camera using a recording medium in which subject images formed through said photographic optical system are electrically developed, said exposure control apparatus comprising:

a focal-plane shutter for opening and closing an optical path of said photographic optical system, said focal-plane shutter being positioned in front of said recording medium;

a voltage applying system, said voltage applying system applying a voltage to said recording medium;

a voltage control system, said voltage control system controlling said voltage applying system;

a photometering system, said photometering system photometering subject light before said recording medium starts to be exposed by operation of said focal-plane shutter;

a calculating system, said calculating system calculating an exposure time at which said shutter is driven, using photometering data obtained through said photometering system; and an exposure control system, said exposure control system controlling an exposure of said recording medium by controlling said focal plane shutter and said voltage control system such that when said calculated exposure time is shorter than a predetermined reference exposure time, said voltage applying system applies said voltage to said recording medium after said focal plane shutter is fully opened and, upon application of a voltage for a predetermined period of time, closing of said focal plane shutter commences, said predetermined reference exposure time being a shortest exposure time within a predetermnined exposure period which is less than an exposure time necessary for the focal-plane shutter to perform a slit exposure and said voltage applied to said recording medium is controlled while said shutter is open when said calculated exposure time is equal to or less than said predetermined reference exposure time.

30. The exposure control apparatus of claim 29, wherein said exposure control system controls said shutter and said voltage control system such that said voltage applying system starts applying said voltage to said recording medium after said shutter has fully opened, in the case where said calculated exposure time is equal to or less than said predetermined reference exposure time.

31. The exposure control apparatus of claim 29, wherein said exposure control system controls said shutter and said voltage control system such that said shutter starts closing after said voltage applying system stops applying said voltage to said recording medium in the case where said calculated exposure time is equal to or less than said predetermined reference exposure time.

32. The exposure control apparatus of claim 29, wherein said recording medium comprises an electrostatic data recording medium in which an electric charge corresponding to a subject image is produced, and an electric charge holding medium in which said subject image is visually developed in accordance with said electric charge and which maintains said developed subject image, and wherein said electrostatic data recording medium and said electric charge holding medium each allow said subject light passed through said recording medium to pass therethrough.

33. The exposure control apparatus of claim 32, wherein said electric charge holding medium comprises a dispersive-type liquid crystal display element.

34. The exposure control apparatus of claim 29, wherein said shutter comprises a focal-plane shutter, and wherein said photometering system comprises a photometering sensor which receives subject light passed through said photographic optical system and reflected by a front surface of said focal-plane shutter.

35. The exposure control apparatus of claim 34, wherein said photometering sensor is placed in front of said focal-plane shutter and outside an optical path of said photographic optical system.

36. An exposure control apparatus for an electronic development type camera having a photographic optical system, said camera using a recording medium in which subject images formed through said photographic optical system are electrically developed, said exposure control apparatus comprising:

a focal-plane shutter for opening and closing an optical path of said photographic optical system, said focal-plane shutter being positioned in front of said recording medium;

a voltage applying system, said voltage applying system applying a voltage to said recording medium;

a voltage control system, said voltage control system controlling said voltage applying system;

a photometering system, said photometering system photometering subject light before said recording medium starts to be exposed by operation of said focal-plane shutter;

a calculating system, said calculating system calculating an exposure time at which said focal-plane shutter is driven, using photometering data obtained through said photometering system; and an exposure control system, said exposure control system controlling an exposure of said recording medium by controlling said focal plane shutter and said voltage control system such that when said calculated exposure time is shorter than a predetermined reference exposure time, said voltage applying system applying said voltage to said recording medium after said focal plane shutter is fully opened and, upon application of a voltage for a predetermined period of time, closing of said focal plane shutter commences, said predetermined reference exposure time being a shortest exposure time within a predetermined exposure period which is less than an exposure time necessary for the focal-plane shutter to perform a slit exposure and said voltage applying system starts applying said voltage to said recording medium and subsequently stops applying said voltage to said recording medium while said focal plane shutter is fully open when said calculated exposure time is equal to or less than said predetermined reference exposure time.

* * * * *